(12) United States Patent
Shim et al.

(10) Patent No.: US 11,106,245 B2
(45) Date of Patent: Aug. 31, 2021

(54) ELECTRONIC APPARATUS FOR CONTROLLING SIZE OF DISPLAY AND CONTROL METHOD THEREOF

(71) Applicant: LG ELECTRONICS INC., Seoul (KR)

(72) Inventors: Hongjo Shim, Seoul (KR); Seounghwan Seol, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/734,247

(22) Filed: Jan. 3, 2020

(65) Prior Publication Data

US 2021/0157366 A1    May 27, 2021

(30) Foreign Application Priority Data

Nov. 22, 2019   (WO) ................ PCT/KR2019/016116

(51) Int. Cl.
*G06F 3/041*    (2006.01)
*G06F 1/16*    (2006.01)

(52) U.S. Cl.
CPC .......... *G06F 1/1652* (2013.01); *G06F 1/1643* (2013.01); *G06F 3/0412* (2013.01); *G06F 3/0414* (2013.01); *G06F 2203/04102* (2013.01)

(58) Field of Classification Search
CPC .... G06F 1/1643; G06F 1/1652; G06F 3/0412; G06F 3/0414; G06F 2203/04102
See application file for complete search history.

(56) References Cited

U.S. PATENT DOCUMENTS

| | | | |
|---|---|---|---|
| 9,245,477 B2 * | 1/2016 | Kwack | G09G 3/3225 |
| 9,681,538 B2 | 6/2017 | Ahn | |
| 10,488,957 B2 * | 11/2019 | Kim | G06F 1/1652 |
| 10,553,135 B2 * | 2/2020 | Lee | G09F 9/301 |
| 2001/0008582 A1 * | 7/2001 | Sato | G02F 1/133348 396/429 |
| 2002/0090980 A1 * | 7/2002 | Wilcox | G06F 1/1684 455/566 |
| 2005/0176470 A1 * | 8/2005 | Yamakawa | G09G 3/001 455/566 |
| 2009/0051830 A1 * | 2/2009 | Matsushita | G06F 1/1647 348/836 |

(Continued)

FOREIGN PATENT DOCUMENTS

| | | |
|---|---|---|
| EP | 3503537 | 6/2019 |
| EP | 3677988 | 7/2020 |

(Continued)

OTHER PUBLICATIONS

PCT International Application No. PCT/KR2019/016116, International Search Report dated Aug. 20, 2020, 4 pages.

(Continued)

*Primary Examiner* — Joe H Cheng
(74) *Attorney, Agent, or Firm* — Lee, Hong, Degerman, Kang & Waimey

(57) ABSTRACT

Provided is an electronic apparatus including a flexible display disposed such that a size of the display exposed on a first surface of the electronic apparatus is changed, and a controller configured to identify a first input that is input to at least one of the first surface and the second surface and control the size of the display exposed on the first surface based on the first input.

20 Claims, 21 Drawing Sheets

(56) References Cited

U.S. PATENT DOCUMENTS

| | | | |
|---|---|---|---|
| 2012/0212433 A1 | 8/2012 | Lee et al. | |
| 2012/0314400 A1* | 12/2012 | Bohn | H01L 51/5237 |
| | | | 362/97.1 |
| 2013/0127918 A1* | 5/2013 | Kang | G06F 1/1652 |
| | | | 345/660 |
| 2013/0201208 A1* | 8/2013 | Cho | G06F 3/0488 |
| | | | 345/619 |
| 2013/0252668 A1 | 9/2013 | Cheng et al. | |
| 2014/0204037 A1* | 7/2014 | Kim | G06F 3/03 |
| | | | 345/173 |
| 2015/0153777 A1 | 6/2015 | Liu et al. | |
| 2016/0041684 A1* | 2/2016 | Rhee | H04N 5/23212 |
| | | | 345/173 |
| 2016/0349971 A1 | 12/2016 | Chi et al. | |
| 2017/0075479 A1 | 3/2017 | Tsukamoto | |
| 2017/0168769 A1* | 6/2017 | Jeon | G06F 1/1652 |
| 2018/0103132 A1* | 4/2018 | Prushinskiy | G06F 1/1615 |
| 2019/0146558 A1 | 5/2019 | Ohata et al. | |
| 2019/0155492 A1 | 5/2019 | Woo et al. | |
| 2019/0179590 A1* | 6/2019 | Jeong | G06F 3/04883 |
| 2019/0238759 A1* | 8/2019 | Ahn | G06F 3/04883 |
| 2019/0261519 A1* | 8/2019 | Park | H04N 9/3188 |
| 2019/0268455 A1 | 8/2019 | Baek et al. | |
| 2019/0317550 A1* | 10/2019 | Kim | G06F 1/1677 |
| 2020/0225848 A1* | 7/2020 | Yoon | G06F 3/04883 |

FOREIGN PATENT DOCUMENTS

| | | |
|---|---|---|
| KR | 1020160139643 | 12/2016 |
| KR | 1020170069103 | 6/2017 |
| KR | 1020190101184 | 8/2019 |
| KR | 1020190119719 | 10/2019 |

OTHER PUBLICATIONS

European Patent Office Application Serial No. 20150906A, Search Report dated Jul. 24, 2020, 16 pages.

* cited by examiner (a)  (b)

(a)

(b)

(a)          (b)

(a)　　　　　　　　　　(b)

(a)　　　　　　　　　　(b)

(a)   (b)

(a)

(b)

ELECTRONIC APPARATUS FOR CONTROLLING SIZE OF DISPLAY AND CONTROL METHOD THEREOF

CROSS-REFERENCE TO RELATED APPLICATION

Pursuant to 35 U.S.C. § 119, this application claims the benefit of earlier filing date and right of priority to International Application No. PCT/KR2019/016116, filed on Nov. 22, 2019, the contents of which are all hereby incorporated by reference herein in its entirety.

BACKGROUND

1. Field

This disclosure relates to an electronic apparatus for controlling a size of a display based on an input related to the display, and a control method thereof.

2. Description of the Related Art

Advances of network technologies and expansions of infrastructures have enabled an electronic apparatus with a display to perform various and professional tasks. Accordingly, there has been an increasing desire for a display that displays content on a large screen.

However, a display providing a larger screen may increase in size proportionally to a size of a screen. Thus, it is necessary to consider a portability along with a size of the display in terms of an electronic apparatus of which the portability is emphasized, such as a mobile terminal.

It can be considered a method to change a size of a display as needed by applying a display having an elasticity sufficient to be rollable or foldable to the electronic apparatus. For example, a display may be provided such that a portion of the display is wound inwardly or toward a rear surface of a mobile terminal. In this example, the wound portion may be unwound or moved as needed, so that an exposed portion of the display increases.

In the electronic apparatus including a display having a variable exposure size, a size of the display may be changed simply in response to a physical force being applied. Accordingly, there is a desire for a method of controlling a size of a display with increased ease and efficiency.

SUMMARY

An aspect provides an electronic apparatus that changes a size of a display based on an input to at least one surface of the electronic apparatus, thereby more easily and efficiently changing the size of the display and improving usability, and a control method of the electronic apparatus.

Technical goals of the present disclosure are not limited as mentioned above and, although not mentioned, may include goals that can be clearly understood by those skilled in the art to which the present disclosure pertains, from the following description.

According to an aspect, there is provided an electronic apparatus including a flexible display disposed such that a size of a display exposed on a first surface of the electronic apparatus is changed, and a controller. The controller is configured to identify a first input that is input to at least one of the first surface and a second surface of the electronic apparatus, and control the size of the display exposed on the first surface based on the first input.

According to another aspect, there is also provided a control method of an electronic apparatus that includes a flexible display disposed such that a size of a display exposed on a first surface of the electronic apparatus is changed. The control method includes identifying a first input that is input to at least one of the first surface and a second surface, and controlling the size of the display exposed on the first surface based on the first input.

BRIEF DESCRIPTION OF THE DRAWINGS

The above and other aspects, features, and advantages of certain embodiments will be more apparent from the following detailed description taken in conjunction with the accompanying drawings, in which.

DETAILED DESCRIPTION

Figure 1:
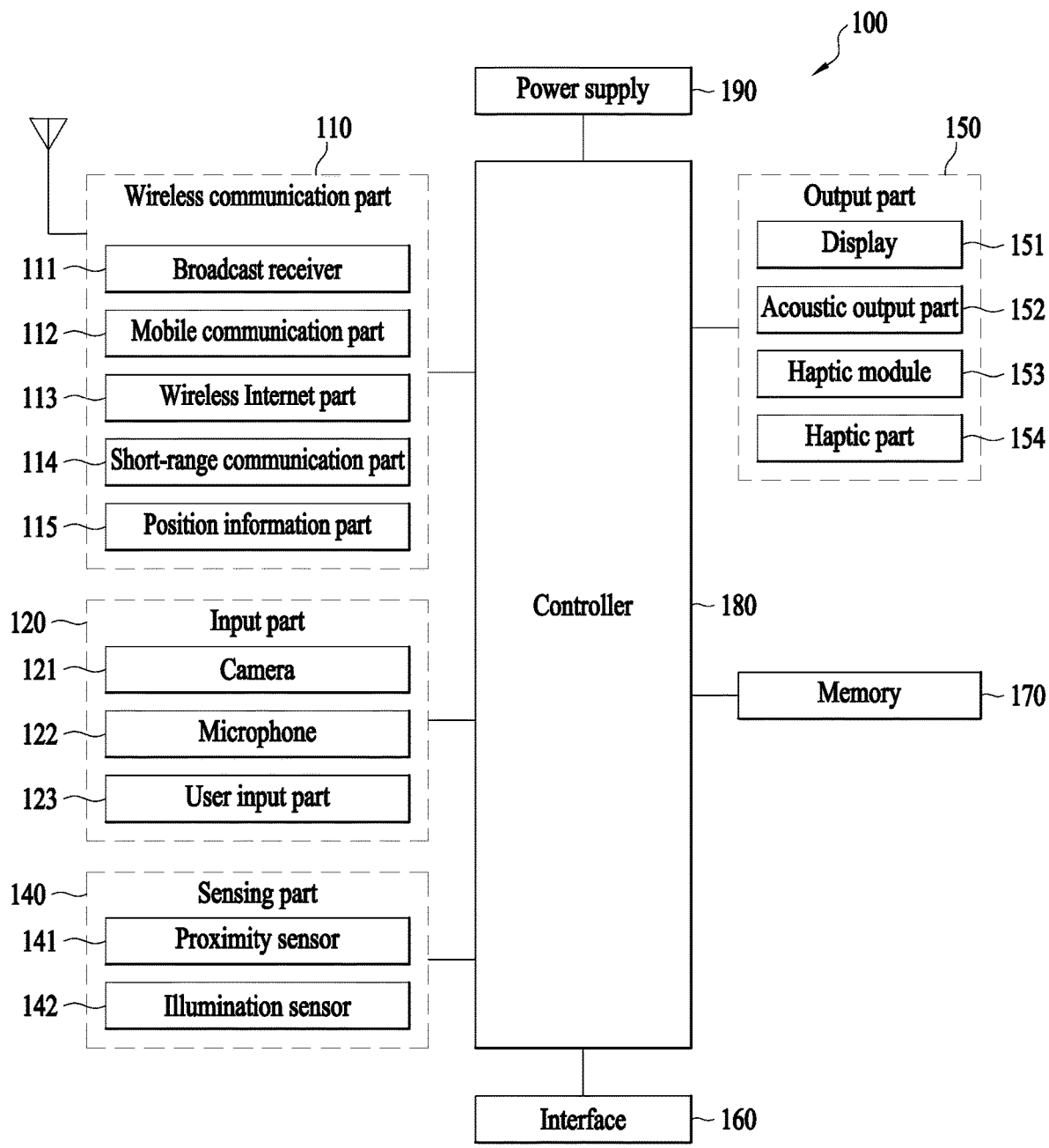
FIG. 1 is a block diagram illustrating an electronic apparatus related to the present disclosure.

Hereinafter, embodiments of the present disclosure will be described in detail with reference to the accompanying drawings. The same or similar components may be given the same reference numerals regardless of the reference numerals, and redundant description thereof may be omitted. With respect to constituent elements used in the following description, suffixes "module" and "unit" are given or mingled with each other only in consideration of ease in the preparation of the specification, and do not have or serve as different meanings. Also, in the description of embodiments, detailed description of well-known related structures or functions will be omitted when it is deemed that such description will cause ambiguous interpretation of the present disclosure. It should be understood, however, that there is no intent to limit this disclosure to the particular example embodiments disclosed. On the contrary, example embodiments are to cover all modifications, equivalents, and alternatives falling within the scope of the example embodiments.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the singular forms "a", "an" and "the" are intended to include the plural forms as well, unless the context clearly indicates otherwise.

It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

FIG. 1 is a block diagram illustrating an electronic apparatus (or a mobile terminal) 100 related to an example embodiment of the present disclosure.

An electronic apparatus 100 may include a wireless communication part 110, an input part 120, a sensing part 140, an outer part 150, an interface 160, a memory 170, a controller (or processor) 180, and a power supply 190. The components illustrated in FIG. 1 are not essential to implementing the electronic apparatus, so the electronic apparatus 100 described herein may have more or fewer components than those listed above.

Specifically, the wireless communication part 110 may include at least one module that enables wireless communication to be performed between the electronic apparatus 100 and a wireless communication system, between the electronic apparatus 100 and another electronic apparatus 100, or between the electronic apparatus 100 and an external server. The wireless communication part 110 may include one or more modules that connect the electronic apparatus 100 to one or more networks.

The wireless communication part 110 may include at least one of a broadcast receiver 111, a mobile communication part 112, a wireless Internet part 113, a short-range communication part 114, and a position information part 115.

Referring to the wireless communication part 110, the broadcast receiver 111 of the wireless communication part 110 may receive a broadcast signal and/or broadcast related information from an external broadcast management server through a broadcast channel. The broadcast channel may include a satellite channel and a terrestrial channel. Two or more broadcast receivers may be provided to the mobile terminal 100 for simultaneous broadcast reception or broadcast channel switching for at least two broadcast channels.

The mobile communication part 112 may transmit and receive a wireless signal to and from at least one of a base station, an external terminal, and a server on a mobile communication network constructed based on technical standards for mobile communication or communication schemes such as Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), Long Term Evolution-Advanced (LTE-A), and the like, for example.

The wireless signal may include various types of data based on transmission and reception of a voice call signal, a video call signal, or a text/multimedia message.

The wireless Internet part 113 may refer to a module for wireless Internet access, and may be embedded or disposed external to the electronic apparatus 100. The wireless Internet part 113 may be adapted to transmit or receive the wireless signal in the communication network based on wireless Internet technologies.

The wireless Internet technologies may be, for example, Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet part 113 may transmit and receive data based on at least one wireless Internet technology in a range including Internet technologies not listed above.

In view of that the wireless Internet access made by WiBro, HSDPA, HSUPA, GSM, CDMA, WCDMA, LTE, and LTE-A is based on a mobile communication network, the wireless Internet part 113 that performs the wireless Internet access through the mobile communication network may be understood as a kind of the mobile communication part 112.

The short-range communication part 114 may be for short-range communication, and may support the short-range communication using at least one of Bluetooth™, Radio Frequency Identification (RFID), Infrared Data Association (IrDA), Ultra Wideband (UWB), ZigBee, NFC (Near Field Communication), Wi-Fi (Wireless-Fidelity), Wi-Fi Direct, Wireless Universal Serial Bus (USB) technology. The short-range communication part 114 may use wireless area networks to support wireless communication between the electronic apparatus 100 and a wireless communication system, wireless communication between the electronic apparatus 100 and another electronic apparatus 100, or wireless communication between the electronic apparatus 100 and a network in which another mobile terminal (100 or external server). The wireless range networks may be wireless personal area networks.

The position information part 115 may be a module that acquires a position (or current position) of a mobile terminal. A representative example of the position information part 115 may be a global positioning system (GPS) mobile or a Wi-Fi module. The mobile terminal may use the GPS module to acquire a position of the mobile terminal using signals transmitted from a GPS satellite. The mobile terminal may use the Wi-Fi module to acquire a position of the mobile terminal based on information on a wireless access point (AP) that transmits or receives a wireless signal to or from the Wi-Fi module. As necessary, the position information part 115 may perform a certain function of other modules of the wireless communication part 110 to acquire data on the position of the mobile terminal, additionally or in substitution. The position information part 115 may be a module used to acquire a position (or current position) of the mobile terminal and is not limited as a module that directly calculates or acquires a position of the mobile terminal.

The input part 120 may include a camera 121 or an image input part to receive an image signal input, a microphone 122 or an audio input part to receive an audio signal input, or a user input part 123, for example, a touch key and a mechanical key to receive information from a user. Voice data or image data collected by the input part 120 may be analyzed and processed as a control command of the user.

The camera 121 may process an image frame such as a stationary image or a moving image acquired by an image sensor in a video call mode or a capturing mode. The processed image frame may be displayed on the display 151 or stored in the memory 170. For example, the electronic apparatus 100 may include a plurality of cameras 121. In this example, the cameras 121 may be arranged in a matrix structure. Through the cameras 121 arranged in the matrix structure, a plurality of pieces of image information having various angles and focal points may be input to the electronic apparatus 100. Also, the plurality of cameras 121 may be arranged in a stereo structure to acquire left and right images for implementing a stereo image.

The microphone 122 may process an external acoustic signal into electrical voice data. The processed voice data may be variously used based on a function performed (or an application program executed) in the electronic apparatus 100. In the microphone 122, various noise removal algorithms may be implemented to remove noise generated in a process of receiving external acoustic signals.

The user input part 123 may be to receive information from a user. When the information is input through the user input part 123, the controller 180 may control an operation of the electronic apparatus 100 based on the input information. The user input part 123 may include a mechanical input means (or a mechanical key, for example, a button a dome switch, a jog wheel, and a jog switch on a front, rear, or side surface of the electronic apparatus 100) and a touch input means. The touch input means may include a virtual key, a soft key, or a visual key displayed on a touch screen through a software process, or include a touch key in a portion other than the touch screen. The virtual key or the visual key may each be displayed in a variety of forms and be any one or in a combination of, for example, graphics, texts, icons, and videos.

The sensing part 140 may include one or more sensors to sense at least one of information in the mobile terminal, surrounding environment information of the mobile terminal, or user information. The sensing part 140 may include at least one of a proximity sensor 141, an illumination sensor 142, a touch sensor, an acceleration sensor, a magnetic sensor, a gravity (G)-sensor, a gyroscope sensor, a motion sensor, an RGB sensor, an infrared (IR) sensor, an ultrasonic sensor, a finger scan sensor, an optical sensor, for example, a camera (refer to the camera 121), a microphone (refer to the microphone 122), a battery gauge, an environment sensor (for example, a barometer, a hygrometer, a thermometer, a radioactivity sensor, a heat sensor, and a gas detection sensor), and a chemical sensor (for example, an electronic nose, a healthcare sensor, and a biometric sensor). In the present disclosure, the mobile terminal may use a combination of pieces of information sensed in at least two sensors among the aforementioned sensors.

The output part 150 may be to generate a visual, auditory, or tactile output. The output part 150 may include at least one of the display 151, an acoustic output part 152, a haptic part 153, and an optical output part 154. The display 151 may form a layer structure or an integrated structure with a touch sensor to implement a touch screen. The touch screen may function as the user input part 123 that provides an input interface between the electronic apparatus 100 and a user and simultaneously, provide an output interface between the electronic apparatus 100 and the user.

The acoustic output part 152 may output audio data stored in the memory 170 or received from the wireless communication part 110 in, for example, a call signal reception, a call mode or a recording mode, a voice recognition mode, and a broadcast reception mode. The acoustic output part 152 may output an acoustic signal related to a function (for example, a call signal reception sound and a message reception sound) performed in the electronic apparatus 100. For example, the acoustic output part 152 may include at least one of a receiver, a speaker, or a buzzer.

The haptic part 153 may generate various tactile effects to be experienced by a user. A vibration may be a representative example of the tactile effects generated by the haptic part 153. An intensity and a pattern of the vibration generated by the haptic part 153 may be determined based on a selection of a user or setting of the controller 180. For example, the haptic part 153 may output a combination of different vibrations or output different vibrations in sequence.

The optical output part 154 may output a signal to announce an event occurrence using light of a light source of the electronic apparatus 100. An event occurring in the electronic apparatus 100 may be, for example, message reception, a call signal reception, missed call, alarm, schedule notification, e-mail reception, and application-based information reception.

The interface 160 may function as a passage to various types of external devices connected to the electronic apparatus 100. For example, the interface 160 may include at least one of a wired/wireless headset port, an external charger port, a wired/wireless data port, a memory card port, a port connecting a device equipped with an identification module, an audio input/output (I/O) port, a video I/O port, and an earphone port. In response to the interface 160 being connected to an external device, the electronic apparatus 100 may perform an appropriate control associated with the connected external device.

The memory 170 may store data supporting various functions of the electronic apparatus 100. The memory 170 may store application programs (or applications) run in the electronic apparatus 100, data for operation of the electronic apparatus 100, and instructions. At least a portion of the application programs may be downloaded from an external server through wireless communication. Also, at least a portion of the application programs may exist in the electronic apparatus 100 for a basic function (for example, call forwarding and outgoing function and message receiving and outgoing function) of the electronic apparatus 100 from the time of manufacture. The application program may be stored in the memory 170, installed in the electronic apparatus 100, and run by the controller 180 to perform an operation (or function) of the mobile terminal.

The controller 180 may generally control an overall operation of the electronic apparatus 100 in addition to operations related to the application programs. The controller 180 may process a signal, data, information, and the like input or output through the aforementioned components or run the application program stored in the memory 170, thereby providing information to a user or performing appropriate information or function.

Also, to run the application program stored in the memory 170, the controller 180 may control at least a portion of the components shown in FIG. 1. Furthermore, to run the application program, the controller 180 may operate a combination of two or more components among the components included in the electronic apparatus 100.

The power supply 190 may supply power to each component included in the electronic apparatus 100 by receiving external or internal power under a control of the controller 180. The power supply 190 may include a battery. The battery may include a built-in battery or a removable battery.

At least a portion of the aforementioned components may operate in cooperation with each other to implement an operation, a control, or a control method of the mobile terminal according to various embodiments as described below. Also, the operation, control, or control method of the mobile terminal may be implemented on the mobile terminal through an execution of at least one application program stored in the memory 170.

The electronic apparatus 100 may be in a bar shape but not limited thereto. The electronic apparatus 100 may have various shapes within the scope of not contradicting features of the present disclosure.

In the present disclosure, the electronic apparatus 100 may refer to a mobile terminal obtained by applying a flexible display to the above-described mobile terminal. The flexible display may refer to a flexible display to be bent such that a winding area is changed.

The flexible display may refer to a lightweight and durable display manufactured on a thin and flexible substrate so as to be curved, bendable, folded, twisted, or rolled like a paper while having a characteristic of a typical flat panel display.

The flexible display may implement a flexible touch screen in combination with a touch sensor. In response to a touch being input through the flexible touch screen, the controller 180 may perform a control corresponding to the touch input.

The touch sensor may sense a touch (or touch input) applied to the touch screen based on at least one of various touch types including a resistive type, a capacitive type, an infrared type, an ultrasonic type, and a magnetic field type.

As an example, the touch sensor may be configured to convert a change such as a pressure applied to a predetermined portion of the touch screen or a capacitance generated at the predetermined portion into an electrical input signal.

The touch sensor may be configured to detect a position at which a touch object applying a touch on the touch screen is touched on the touch sensor, an area, a touch pressure, a touch capacitance, and the like.

The electronic apparatus 100 may include a deformation detection means that detects a deformation of the flexible display. The deformation detection means may be included in the sensing part.

Information related to the deformation may include, for example, a direction in which the flexible display is deformed, a degree of deformation, a deformed position, a deformation time, and an acceleration at which the deformed flexible display is restored. In addition, the information related to the deformation may be various information to be detected in response to the flexible display being bent.

Also, based on the information related to the deformation of the flexible display detected by the deformation detection means, the controller 180 may change information displayed on the flexible display or generate a control signal for controlling functions of the electronic apparatus 100.

A state change of the flexible display, for example, an expansion or reduction of a front surface area may occur due to an external force but not be limited thereto. For example, the front surface area of the flexible display may be expanded or reduced by the user or based on a command of an application. A driver may be included to change the state of the flexible display without applying the external force.

When the flexible display covers from the front surface to a rear surface, a space implemented in a typical rear case to mount an antenna may be restricted. Thus, the antenna may be embodied on the flexible display. An antenna on display (AOD) may be in a form of a transparent film in which an electrode layer including a pattern and a dielectric layer are laminated. The AOD may be implemented to be thinner than a laser direct structuring (LDS) antenna implemented through copper nickel plating, have a low thickness dependency, and be invisible on appearance.

The display 151 may be implemented as the flexible display. The flexible display 151 may refer to a plurality of panel sets that directly perform an output function, including the flexible display. For example, the flexible display 151 may include the flexible display and the touch screen. The above-described properties of the deformable flexible display may be equally applied to the flexible display 151. The display 151 mentioned below is assumed to be the flexible display 151 unless otherwise state.)

Figure 2:
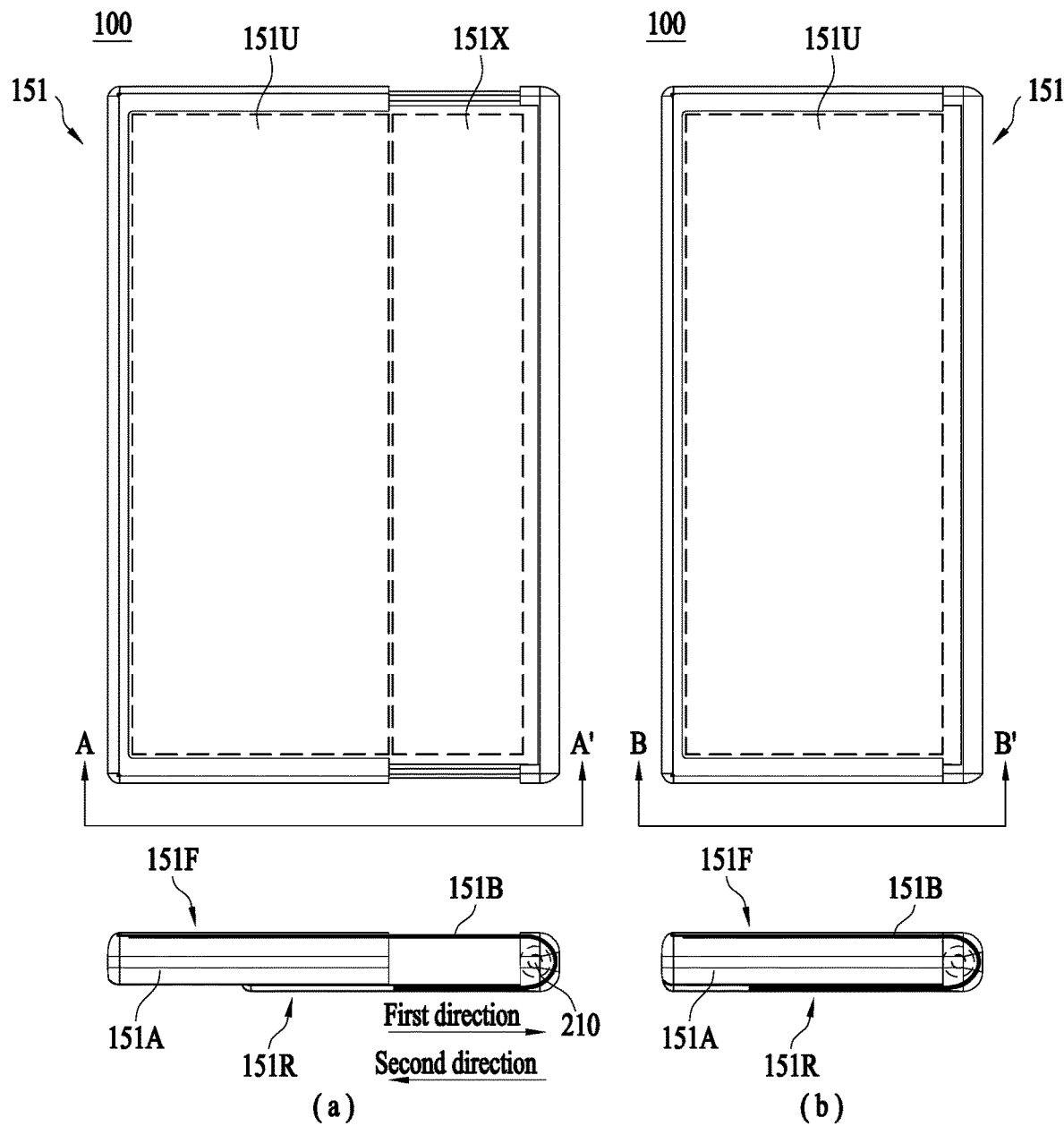
FIGS. 2 and 3 illustrate views obtained before and after an expansion of a display of an electronic apparatus related to the present disclosure.
Figure 3:
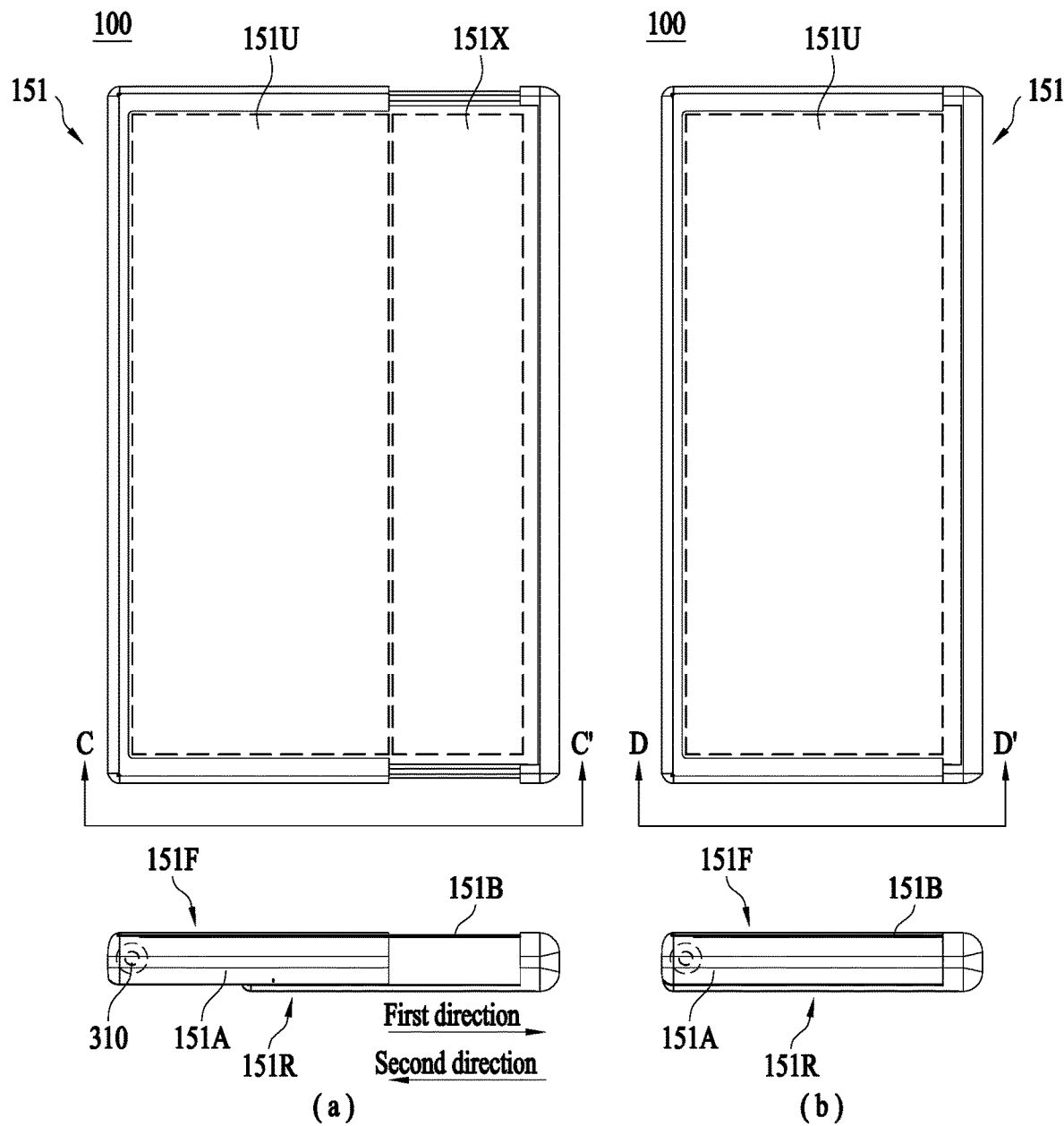

FIGS. 2 and 3 are diagrams illustrating a display 151 of an electronic apparatus 100 before and after an expansion of the display 151 according to an example embodiment of the present disclosure.

In an example of FIG. 2, a first directional edge 210 may be an edge at which a display is wound in association with expansion of the display 151. In an example of FIG. 3, an edge at which a display is wound may be a second direction edge 310 facing the first directional edge 210.

Referring to FIG. 2, the display 151 may have one side fixed at a front surface area based on the electronic apparatus 100. The display 151 may be wound at a first directional edge, so as to be provided over a rear surface (or back surface). A front surface area 151F of the display 151 may be expandable. In this example, a rear surface area 151R of the display 151 may be reduced. Conversely, when the front surface area 151F of the display 151 is reduced, the rear surface area 151R of the display 151 may be expanded.

A direction in which the front surface area 151F of the display 151 is expanded may be defined as a first direction and a direction in which the front surface area 151F is reduced may be defined as a second direction. In this case, as the front surface area 151F is expanded, the first directional edge 210 of the display 151 may move in the first direction. Also, as the front surface area 151F of the display 151 is reduced, the first directional edge 210 of the display 151 may move in the second direction.

To guide and support the expanded and reduced display 151, a frame supporting the display 151 may also be expanded and reduced accordingly. The frame may include a first frame 151A and a second frame 151B that slidably moves in the first direction relative to the first frame 151A.

In the front surface area 151F of the display 151, an area constantly maintained irrespective of an expansion and a reduction may be defined as a fixed area 151U. Also, an area selectively exposed on the front surface in accordance with the expansion and the reduction may be defined as a variable area 151X. Based on a state in which the front surface area 151F of the display 151 is expanded, the fixed area 151U of the display 151 may be located in the first frame 151A and the variable area 151X of the display 151 may be located in the second frame 151B.

When the second frame 151B slides in the first direction and extends from the first frame 151A, the front surface area 151F of the display 151 may be expanded, so that the fixed area 151U and the variable area 151X are exposed on the front surface. When the second frame 151B slides in the direction opposite to the first direction and contracted from the first frame 151A, the front surface area 151F of the display 151 may be reduced, so that only the fixed area 151U remains.

A rear surface area of the display 151 may be exposed on a rear surface of the second frame 151B. The display rear surface area may be covered by a light-transmitting rear window to be viewable externally.

The display front surface area 151F may be exposed on the front surface without using a separate window. In some cases, a deco frame 1005 may cover a boundary area of the display front surface area 151F and the first frame 151A to prevent an inflow of foreign material and cover a bezel area of the electronic apparatus 100 to improve a user's screen visibility.

An electronic device part may be formed in an inner space formed by an appearance structure such as the first frame 151A and the second frame 151B. Electronic components such as a battery 191 for driving the electronic apparatus 100 may be mounted on a main-PCB so as to be included in the electronic device part. An electronic component such as an inner antenna module may be provided directly in the electronic device part, not through the main-PCB.

In the example embodiment, the electronic apparatus 100 may include a driver to control a size of the display 151. The driver may be implemented using, for example, a motor. The electronic apparatus 100 may adjust a moving direction of the first directional edge 210 of the display 151 using the motor, thereby changing the size of the display 151.

Referring to FIG. 3, the display 151 may have one side fixed at a front surface area based on the electronic apparatus 100. The display 151 may be wound at the second direction edge 310, so as to be provided over a rear surface. The front surface area 151F of the display 151 may be expandable. In this example, the rear surface area 151R of the display 151 may be reduced. Conversely, when the front surface area 151F of the display 151 is reduced, the rear surface area 151R of the display 151 may be expanded.

A direction in which the front surface area 151F of the display 151 is expanded may be defined as a first direction and a direction in which the front surface area 151F is reduced may be defined as a second direction. In this case, irrespective of an expansion and a reduction of the front surface area 151F, a position of the second direction edge 310 of the display 151 may be maintained. Since the description of FIG. 2 is applicable here, repeated description of FIG. 3 will be omitted.

Although FIGS. 2 and 3 illustrate that the display is expanded in the first direction, embodiments are not limited thereto. The display may also be expanded in, for example, the second direction. In the following description, a display expansion may be made in various directions (e.g., the first direction or the second direction) depending on an implementation scheme.

Figure 4:
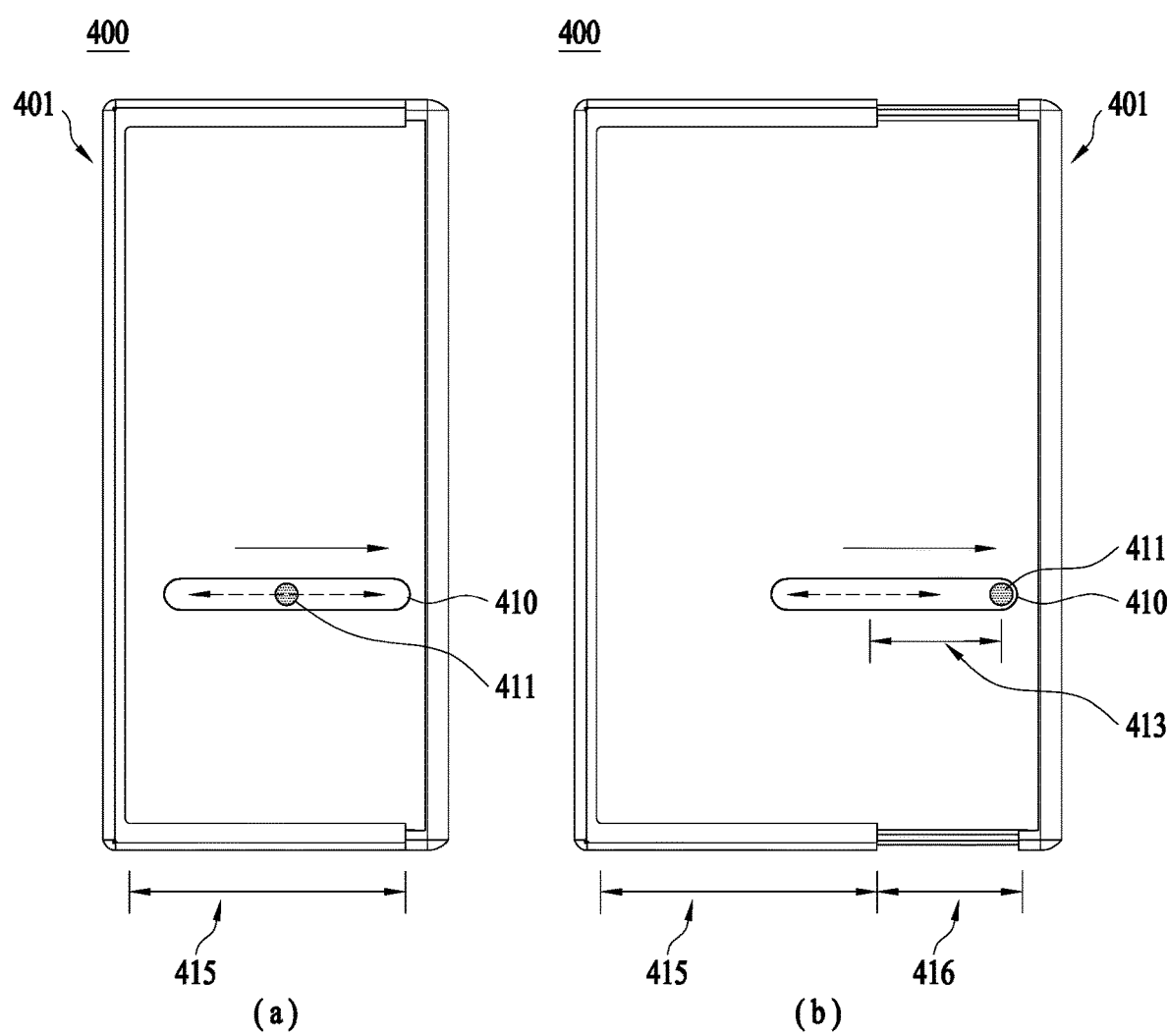
FIG. 4 is a diagram illustrating an operation of an electronic apparatus according to an example embodiment of the present disclosure.

FIG. 4 is a diagram illustrating an operation of an electronic apparatus according to an example embodiment of the present disclosure. Specifically, (a) of FIG. 4 illustrates a display 401 of an electronic apparatus 400 viewed before an expansion, and (b) of FIG. 4 illustrates the display 401 viewed after the expansion.

Referring to (a) of FIG. 4, a first input 411 for expansion of the display 401 may be input to the display 401 of the electronic apparatus 400. The first input 411 may include, for example, a touch input to the display 401.

Referring to (a) of FIG. 4, the first input 411 may be sensed when the display 401 is in a basic state. In the example embodiment, the basic state may be a state in which an area constantly maintained irrespective of the expansion and the reduction of the display 401 is displayed on a first surface of the electronic apparatus 400.

When it is defined that the display 401 has a first length 415 in the basic state, the display 401 may have a length in which a second length 416 corresponding to an expanded portion is added to the first length 415 in an expanded state as illustrated in FIG. 4.

In the example embodiment, an indicator 410 may be displayed on the display 401 in response to the first input 411 being input. The indicator 410 may be displayed based on the first input 411. In one example, a predetermined portion of the indicator 410 (e.g., a center of the indicator 410) may be disposed at a position to which the first input 411 is input, so that the indicator 410 is displayed. Related description will be made with reference to FIG. 12.

In another example, a length or size of the indicator 410 may be determined based on a position to which the first input 411 is input, so that the indicator 410 in the determined length or size is displayed. Related description will be made with reference to FIGS. 13 and 14.

The indicator 410 may be associated with the expansion of the display 401. In such case, the size of the display 401 may be controlled based on the first input 411 to the indicator 410.

In one example, when the first input 411 moves on the indicator 410 by a specific distance 403, the display 401 may be expanded to correspond to the specific distance 403. In this example, the second length 416 may correspond to the specific distance 403.

In another example, when the first input 411 moves on the indicator 410, a size of the display 401 may be determined based on a final position of the first input 411. That is, a size of the display 401 exposed on the first surface may be changed to correspond to the final position of the first input 411. Related description will be made with reference to FIG. 11.

In another example, when the first input 411 moves on the indicator 410, an expansion speed of the display 401 may be determined based on a moving speed of the first input 411. That is, when the display 401 is expanded to have a specific size, a speed of the expansion may be determined to correspond to a moving speed of the first input 411. Related description will be made with reference to FIG. 15.

In another example, a size of the display 401 may be determined based on a type of the first input 411, and an expansion speed of the display 401 may be determined based on the first input 411 to the indicator 410. When the first input 411 is input, an input type may be identified, so that an exposure size of the display 401 may be determined to correspond to the identified input type. In this example, a speed at which the display 401 is expanded to have the determined size may be based on a speed at which the first input 411 moves on the indicator 410. An example related to the first input 411 will be further described with reference to FIGS. 5, 6, and 10.

Although the foregoing example is based on a case in which an input for changing a size of the display 401 on the indicator 410 is received, embodiments are not limited thereto. A size of the display 401 may also be controlled based on a touch input received in response to an indicator being displayed.

Figure 5:
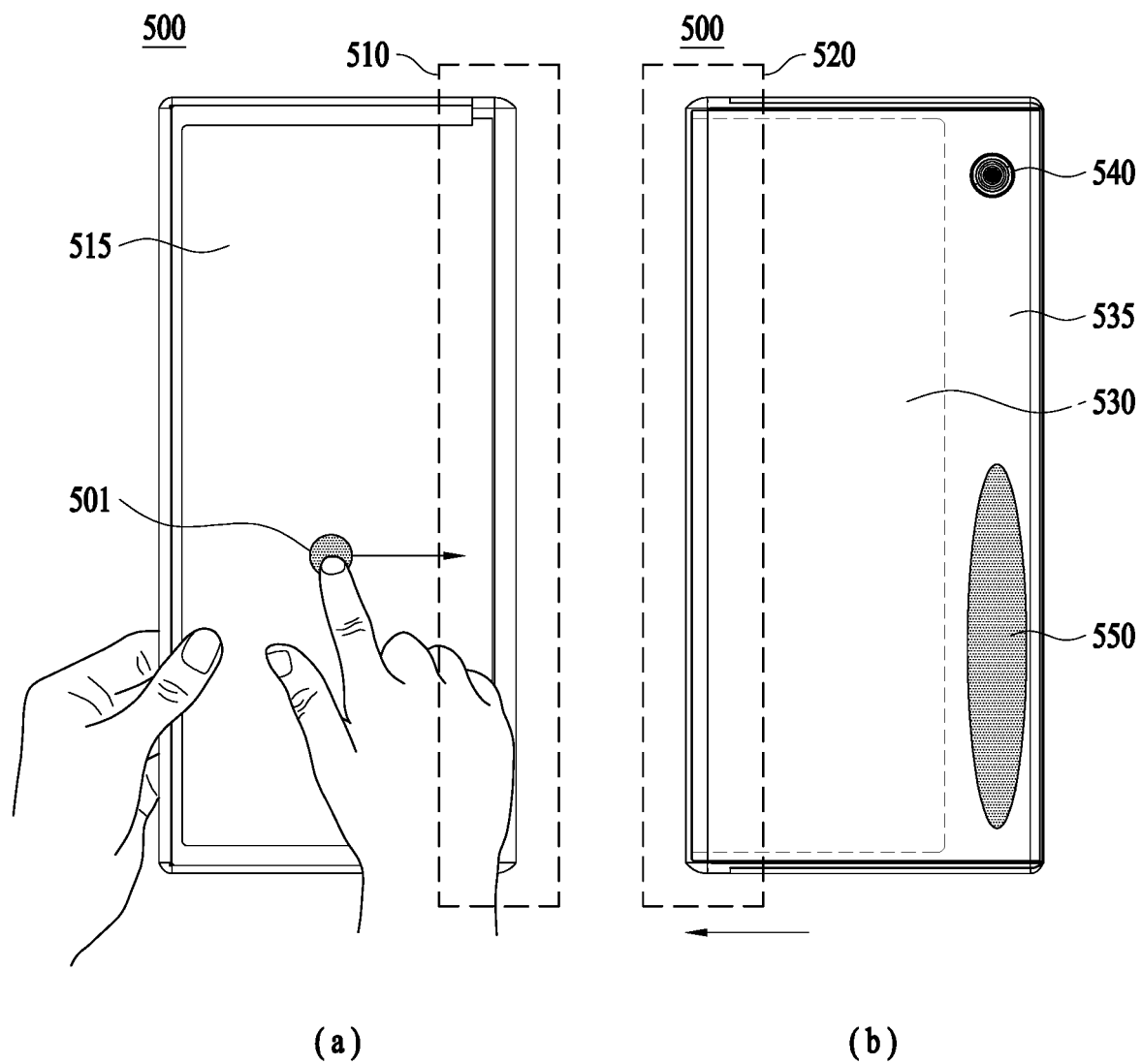
FIGS. 5 and 6 are diagrams illustrating examples of an input applied to an electronic apparatus according to an example embodiment of the present disclosure.
Figure 6:
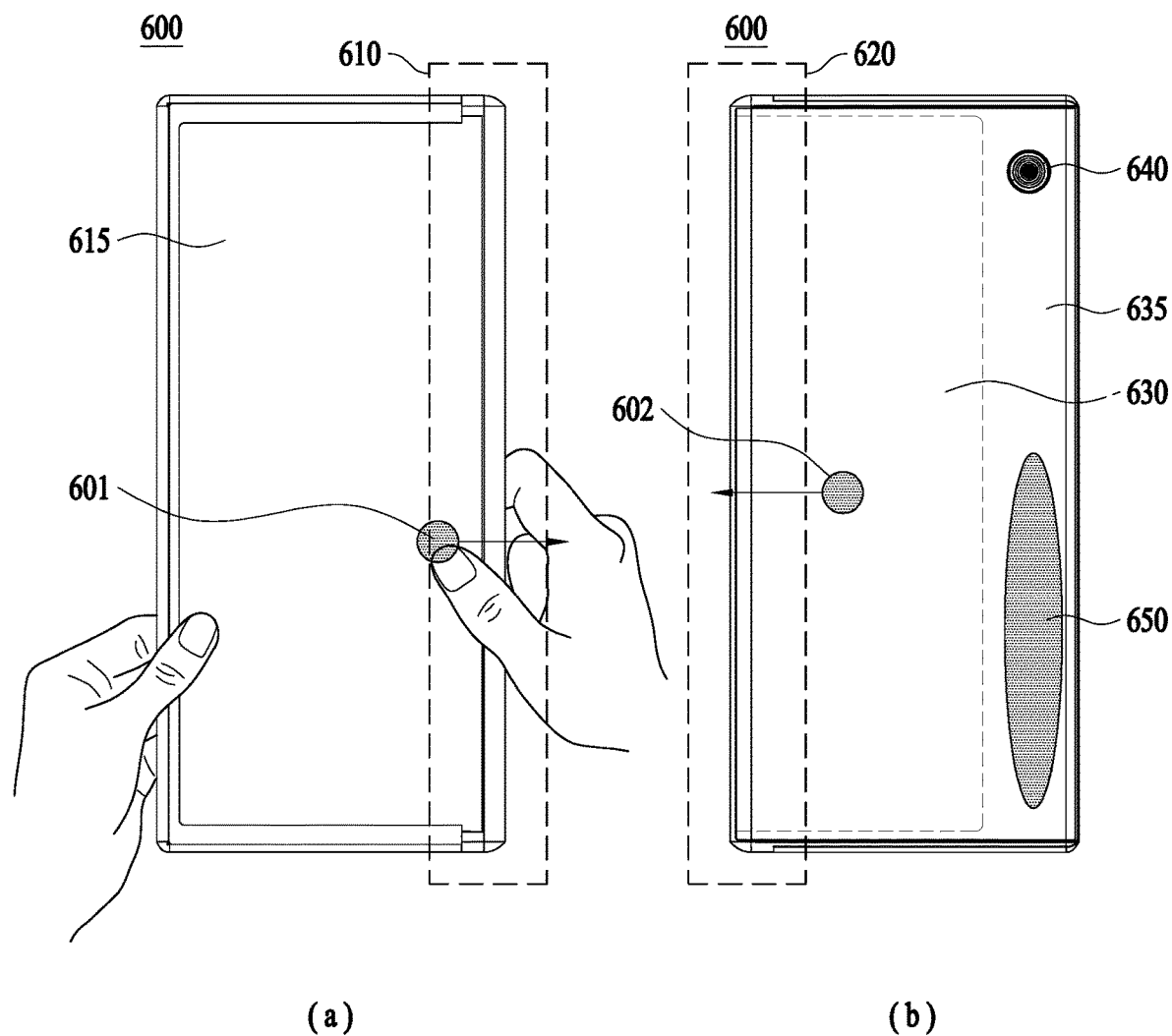

FIGS. 5 and 6 are diagrams for explaining an example of an input applied to an electronic apparatus according to an example embodiment of the present disclosure. Specifically, FIG. 5 is a diagram illustrating a case in which a first input applied to an electronic apparatus 500 is an input to a first surface. FIG. 6 is a diagram illustrating a case in which a first input applied to a display is an input to the first surface and a second surface.

(a) of FIG. 5 conceptually illustrates a first surface (e.g., a front surface) of the electronic apparatus 500. Referring to (a) of FIG. 5, an area of a display exposed on the first surface of the electronic apparatus 500 may be defined as a front surface area 515. A first input 501 may be applied to the front surface area 515. The first input 501 may be moved in a specific direction. The specific direction may be, for example, a direction toward one surface 510 of the electronic apparatus 500 (e.g., the first direction of FIG. 2 or 3). The direction toward the one surface 510 may be a direction in which a display of the electronic apparatus 500 is expanded.

In some cases, a plurality of inputs may be applied to the electronic apparatus 500. The plurality of inputs may include the first input 501 including an input based on a fingertip of a right hand touching a display, that is, a touch input, and a second input having at least a predetermined area and applied based on a state in which a user is holding the electronic apparatus 500 with a left hand. In such cases, an area of the first input 501 may be different from an area of the second input. For example, the area of the first input 501 may be smaller than the area of the second input.

(b) of FIG. 5 conceptually illustrates a second surface (e.g., a rear surface) of the electronic apparatus 500. When a display area wound at one surface of the electronic apparatus 500 to be located at a rear surface of the electronic apparatus 500 is defined as a rear surface area, a rear surface area 530, a camera 540, and a bezel 535 may be arranged on the rear surface of the electronic apparatus 500. However, embodiments are not limited thereto. At least some of the rear surface area 530, the camera 540, and the bezel 535 may be omitted or other components may be added thereto.

One surface 520 of (b) of FIG. 5 may be a surface corresponding to the one surface 510 of (a) of FIG. 5. The display of the electronic apparatus 500 may be expanded toward the one surface 520.

In the example embodiment, the electronic apparatus 500 may include a sensor that senses an input in association with the bezel 535 (for example, at a lower portion of the bezel 535). In this case, the electronic apparatus 500 may identify a third input 550 that has at least a specific area and is input to a second surface of the display. Here, the third input 550 may be an input applied when a user grips the electronic apparatus 500 and may have an area larger than that of the first input 501.

In some cases, the third input 550 and the second input may be integrally referred to as a single input.

When the first input 501 is acquired, the electronic apparatus 500 may control an exposed display size based on the acquired first input 501. For example, the electronic apparatus 500 may increase the exposed display size to a predetermined size corresponding to the first input 501.

In the example embodiment, when the first input 501, the second input, and the third input 550 are acquired, the electronic apparatus 500 may distinguish the first input 501 from the acquired inputs and control a display size based on the first input 501.

Specifically, the electronic apparatus 500 may distinguish the first input 501, the second input, and the third input 550 based on an area of the corresponding input. For example, the electronic apparatus 500 may determine an input having an area within a predetermined range, to be the first input, and determine an input having an area exceeding the predetermined range, to be the second input or the third input 550. Through this, the electronic apparatus 500 may recognize the first input 501 and control the exposed display size based on the first input 501. For example, the electronic apparatus 500 may increase the exposed display size to a predetermined size corresponding to the first input 501.

(a) of FIG. 6 conceptually illustrates a first surface (e.g., a front surface) of an electronic apparatus 600. (b) of FIG. 6 conceptually illustrates a second surface (e.g., a rear surface) of the electronic apparatus 600. The following description will be made with reference to (a) and (b) of FIG. 6 together and repeated description of FIG. 5 will be omitted.

A front surface area 615 may be located at the front surface of the electronic apparatus 600. The rear surface area 630, a camera 640, and a bezel 635 may be arranged on the rear surface of the electronic apparatus 600.

A first input 601 may be applied to the front surface area 615 of the electronic apparatus 600. A second input 602 may be applied to the rear surface area 630 of the electronic apparatus 600. The first input 601 and the second input 602 may be moved in a specific direction. In a case of the first input 601, the specific direction may be a direction toward one surface 610 of the electronic apparatus 600 (e.g., the first direction of FIG. 2 or 3). In a case of the second input 602, the specific direction may be a direction toward one surface 620 of the electronic apparatus 600.

The direction in which each of the first input 501 and the second input 602 is moved may be the same direction based on the electronic apparatus 600. That is, the direction in which each of the first input 501 and the second input 602 is moved may be a direction in which the display of the electronic apparatus 600 is expanded.

In the example embodiment, each of the first input 501 and the second input 602 may be a touch input of a user and may have a predetermined area or less.

In some cases, the second input 602 may be an input included in the first input 501. That is, the electronic apparatus 600 may identify the first input 501 and the second input 602 applied together within a predetermined time range, as a single input (hereinafter, referred to as an expansion input).

In the example embodiment, even if the first input 501 and the second input 602 are assumed as a single input, the electronic apparatus 600 may also acquire an other input. For example, the other input may also be referred to as a third input. The other input may include an input exceeding a specific area applied to the front surface area 615 of the electronic apparatus 600, and an input 650 exceeding a specific area applied to the bezel 635 of the electronic apparatus 600. The other input may be an input applied based on a state in which a user is gripping the electronic apparatus 600 with a left hand, but not limited thereto.

In this case, since an area of the expansion input is different from an area of an other input (e.g., the input 650), the electronic apparatus 600 may distinguish the expansion input from the other input based on the different areas. The electronic apparatus 600 may control an exposed display size of the electronic apparatus 600 based on a scheme determined in association with the expansion input.

Figure 7:
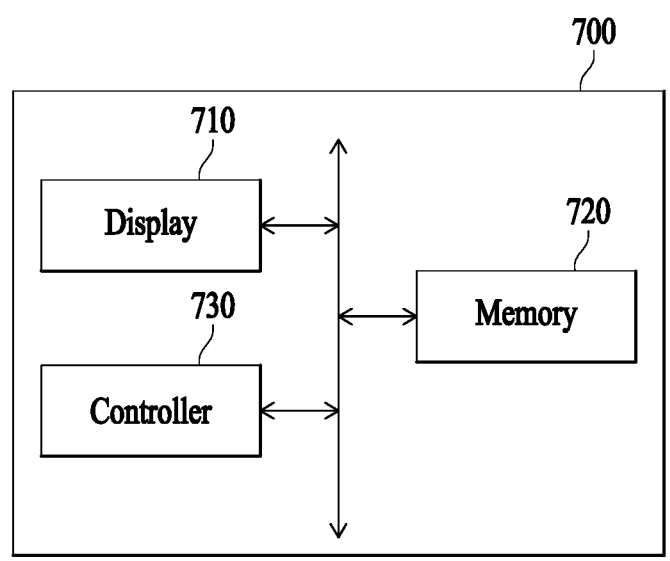
FIG. 7 is a functional block diagram illustrating an electronic apparatus according to an example embodiment of the present disclosure.

FIG. 7 is a functional block diagram illustrating an electronic apparatus according to an example embodiment of the present disclosure.

Referring to FIG. 7, an electronic apparatus 700 may include a display 710, a memory 720, and a controller 730. Each element may be a unit that processes at least one function or operation and may be implemented through hardware, software, or a combination of hardware and software.

The display 710 may be arranged such that a size by which the display 710 is exposed on a first surface of the electronic apparatus 700 (e.g., a front surface of the electronic apparatus 700) is changed. The display 710 may be implemented to be flexible.

The display 710 may display a variety of information associated with an operation of the electronic apparatus 700. The variety of information may include, for example, content associated with an application executed in the electronic apparatus 700.

In the example embodiment, a portion of the display 710 may be disposed on the first surface. Also, another portion of the display 710 may be wound at one surface of the electronic apparatus 700 to be disposed on a second surface of the electronic apparatus 700. Since related description has been made with reference to FIG. 2 or 3, repeated description will be omitted.

The memory 720 may store a variety of information (or instructions) associated with an operation of the electronic apparatus 700. As an example, the memory 720 may store information on a size of the display 710 in association with an input to the display 710. As another example, the memory 720 may store information on various inputs (e.g., an input having one touch positions and an input having two touch positions) associated with a size control of the display 710.

In the example embodiment, a size of the display 710 may be determined for each type of input applied to the electronic apparatus 700. In this case, information on the size of the display 710 determined for each type of input may be stored in the memory 720.

The controller 730 may include one or more processors that control an overall operation of the electronic apparatus 700. Each of the one or more processors may be provided in units of operation or function of the controller 730, but not limited thereto. In some cases, the controller 730 may also be referred to as a processor. However, the present disclosure is not limited by such terminology.

The controller 730 may identify a first input that is input to at least one of the first surface and the second surface of the electronic apparatus 700. Here, at least a portion of the first surface may be located on the front surface of the electronic apparatus 700, and at least a portion of the second surface may be located on a rear surface facing the first surface in the electronic apparatus 700. At least another portion of the second surface may be connected to at least another portion of the first surface.

The first surface may include at least a portion of the display 710 located on the front surface of the electronic apparatus 700. The second surface may include another portion of the display 710 located on the rear surface of the electronic apparatus 700 and connected to the display 710 of the first surface.

In the example embodiment, the first input may be input through the display 710 arranged on the front surface and the rear surface of the electronic apparatus, so that the controller 730 identifies the first input.

The first input may be an input applied by a user and include, for example, at least one touch input. The at least one touch input may include touch inputs applied to different positions. For example, the first input may include a second input applied to a first position of the first surface and a third input applied to a second position of the second surface.

The second input may include, for example, a drag input moving in a first direction. The third input may include, for example, a drag input moving in a second direction. The first direction and the second direction may be directions corresponding to each other in association with expansion or reduction of the display 710. For example, when the first direction is an expansion direction of the display 710, the second direction may be an expansion direction of the display 710.

When a size of the display 710 exposed on the first surface increases, at least a portion of an area of the display 710 related to the third input may overlap an area of the display 710 related to the second input in response to the expansion of the display 710.

For example, when the display 710 is expanded, a display on the second surface may move to the first surface. Accordingly, an area related to the third input applied to the second surface may be located on the first surface. In this example, in response to the expansion of the display 710, an area arranged on the first surface may be located at a position of the area to which the second input has been applied on the first surface. However, this is merely an example and thus, is not to be taken as being limited thereto. For example, whether to be overlapped may be changed based on an expansion direction or a position of the electronic apparatus 700 at which the display 710 is wound.

Also, in the example embodiment, a display may be located on each of the first surface and the second surface. The display may be located adjacent to a third surface between the first surface and the second surface.

The controller 730 may control the size of the display 710 exposed on the first surface based on the first input. In the example embodiment, the controller 730 may control the size of the display 710 exposed on the first surface based on a direction corresponding to the first input. As an example, when the direction corresponding to the first input is the first direction, the controller 730 may increase the size of the exposed display 710. As another example, when the direction corresponding to the first input is the second direction, the controller 730 may reduce the size of the exposed display 710.

When the first input includes a plurality of inputs to at least one of the first surface and the second surface, the controller 730 may identify an area related to each of the plurality of inputs. The controller 730 may determine at least a portion of the plurality of inputs to be the first input based on the identified areas. As an example, based on the identified areas, the controller 730 may exclude an input having an area greater than or equal to a predetermined value among the plurality of inputs, from the first input. As another example, based on the identified areas, the controller 730 may determine an input having an area less than the predetermined value among the plurality of inputs, to be the first input.

The controller 730 may perform at least one of an operation of executing an application and an operation of controlling a size of the display 710 based on a number of touch inputs corresponding to the first input.

As an example, when the number of touch inputs is 1, the controller 730 may expand the display 710 to have a first size. When the number of touch inputs is 2, the controller 730 may expand the display 710 to have a second size. As another example, when the number of touch inputs is 1, the controller 730 may execute a first application and expand the display 710 to have the first size. When the number of touch inputs is 2, the controller 730 may execute the first application and a second application, and expand the display 710 to have the second size. An operation corresponding to the number of touch inputs may be determined in advance and is not limited to the aforementioned examples.

In the example embodiment, when the first input includes the second input applied to the first surface and the third input applied to the second surface, the controller 730 may control the size of the display 710 exposed on the first surface or execute at least one predetermined application based on at least one of the number of touch inputs corresponding to the third input and the number of touch inputs corresponding to the second input.

As an example, when the number of touch inputs of the second input is 1 and the number of touch inputs of the third input is 2, the controller 730 may expand the display 710 to have the first size. As another example, the controller 730 may expand the display 710 to have the first size when a sum of the number of touch inputs of the third input is 2, and may expand the display 710 to have the second size when a sum of the number of touch inputs of the third input is 3.

In some cases, when the first input includes the second input applied to the first surface and the third input applied to the second surface, the controller 730 may control the size of the display 710 exposed on the first surface and execute at least one predetermined application based on at least one of the number of touch inputs corresponding to the third input and the number of touch inputs corresponding to the second input. For example, when the number of touch inputs of the second input is 1 and the number of touch inputs of the third input is 2, the controller 730 may expand the display 710 to have the first size, and execute the first application and the second application.

In the example embodiment, the controller 730 may identify a position of the first input at intervals of a preset time (e.g., 0.1 seconds). When the first input includes a drag input, the controller 730 may acquire information on at least one of a moving direction, a moving speed, and a moving distance of the first input based on the identifying of the position of the first input. In such case, based on the moving direction of the first input being the first direction, the controller 730 may increase the size of the display 710 to correspond to the moving distance of the first input and increase the size of the display 710 at a speed corresponding to the moving speed of the first input.

When the moving direction of the first input is the second direction, the controller 730 may reduce the size of the display 710 to correspond to the moving distance of the first input and reduce the size of the display 710 at a speed corresponding to the moving speed of the first input.

Such speed control may be performed through a pulse width modulation (PWM) control of a control signal associated with driving of a motor related to the expansion of the display 710. The PWM control may be performed by adjusting a pulse width, that is, an on-off time of the control signal associated with the driving of the motor. Through the PWM control, an average voltage supplied to the motor may be controlled, so that a driving speed is adjusted. A relationship between a moving speed of an input and a PWM will be described in detail with reference to FIG. 15.

In the example embodiment, the controller 730 may display content on the display 710. The displayed content or an arrangement of the content may be determined based on the first input applied to the display 710. For example, when the first input includes the third input applied to the second surface and the third input includes two touch inputs, the controller 730 may divide a screen into two portions to arrange the content. When the third input includes three touch inputs, the controller 730 may divide a screen into three portions to arrange the content.

In another example embodiment, when a time in which the first input is maintained and a pressure corresponding to the first input satisfies a preset condition, the controller 730 may control the size of the display 710 exposed on the first surface based on the first input. In this case, the first input may be input before an indicator is displayed in association with the expansion of the display 710. For example, the controller 730 may control the size of the exposed display 710 to a size of the display 710 corresponding to the first input under a condition that the first input is maintained at least one second at a first pressure or more.

The size of the display 710 corresponding to the first input may be determined based on the number of touch inputs included in the first input. Through this, an input accidentally or erroneously applied irrespective of an intention of a user may be identified, which may lead to an improvement in usability of the electronic apparatus 700.

However, the present disclosure is not limited thereto. In some cases, the size of the display 710 corresponding to the first input may be determined based on at least one of a maintenance time of the first input or the pressure corresponding to the first input. For example, when the maintenance time of the first input is a first time, the size of the display 710 may be determined to be the first size.

In the example embodiment, the controller 730 may display an indicator associated with the expansion of the display 710 on the display 710 exposed on the first surface. In some cases, the controller 730 may display the indicator based on the first input. For example, when the first input is applied, the controller 730 may display the indicator such that the first input overlaps a position to which the first input is applied.

In the example embodiment, when the indicator has a predetermined shape and size, the controller 730 may display the indicator such that a center of the first input is coincident with a center of the indicator. Related description will be made with reference to FIG. 12. However, embodiments are not limited thereto. For example, the indicator may be displayed such that a predetermined position of the indicator corresponds to a position of the first input.

In some cases, a length from the center of the first input to an edge of the display 710 may be less than a length of the indicator. In such cases, the controller 730 may display the indicator by adjusting a size of the indicator based on the length from the center of the first input to the edge of the display 710, or request the first input again. Related description will be made with reference to FIG. 13 or 14.

The controller 730 may control the size of the display 710 exposed on the first surface based on a fourth input associated with the indicator. Specifically, the controller 730 may control at least one of the size of the display 710 exposed on the first surface and a speed of changing the size based on at least one of a positional relationship between the fourth input and the indicator and a moving speed of the fourth input.

In the example embodiment, the controller 730 may control the size of the display at a speed corresponding to a speed at which the fourth input moves on the indicator. In this case, whether to increase or reduce the size of the display 710 may be determined based on a moving direction of the fourth input. For example, when the fourth input is a drag input moving in the first direction at a first speed, the controller 730 may expand the display 710 at the first speed.

In another example embodiment, the controller 730 may control the size of the display 710 based on a distance to which the fourth input moves on the indicator. For example, when the fourth input is a drag input moving by the first distance, the controller 730 may increase the size of the display 710 by a length corresponding to the first distance. In this example, whether to expand or reduce the display 710 may be based on a direction of the fourth input. For example, when the display moves in the first direction by the first distance, the size of the display 710 may be increased by a distance corresponding to the first distance. When the display 710 is moved in the second direction by the first distance, the size of the exposed display 710 may be reduced by a size corresponding to the first distance.

In another example embodiment, the controller 730 may control the exposed size of the display 710 based on a position of the fourth input on the indicator. As an example, when the fourth input is applied to a first position on the indicator or a final position of the fourth input is the first position on the indicator, the controller 730 may control the size of the exposed display 710 to be the first size. As another example, when the fourth input is applied to a second position on the indicator or a final position of the fourth input is the second position on the indicator, the controller 730 may control the size of the exposed display 710 to be the second size. The size of the display 710 for each position of the indicator may be determined by the controller 730 in advance.

In the example embodiment, a scheme of controlling the size of the display 710 based on the first input may be set based on an input of a user. Such setting may be performed through a separate screen and related description will be made with reference to FIG. 16 or 17.

In the example embodiment, when the indicator is displayed in association with a size control of the display 710, the indicator may be set based on an input of a user, and the setting may be performed through a separate screen. Related description will be made with reference to FIG. 18.

Figure 8:
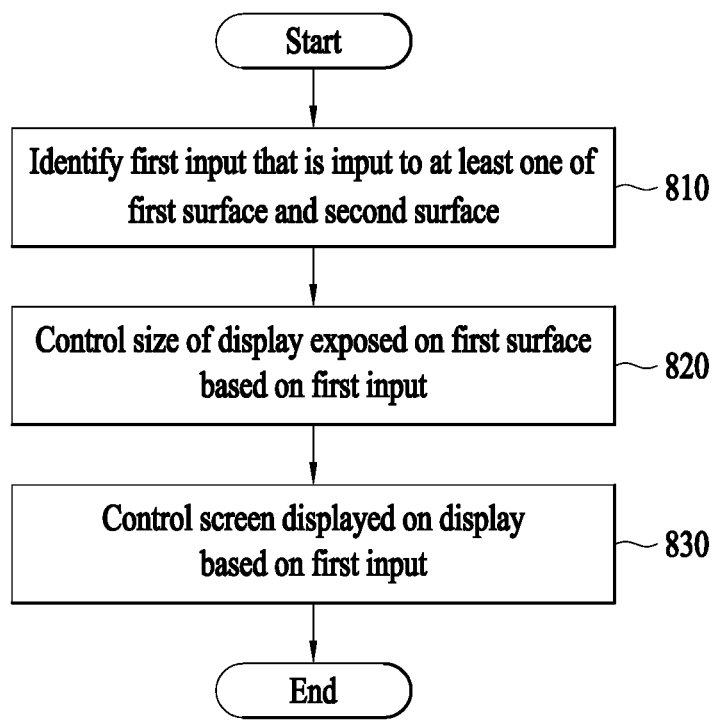
FIG. 8 is a flowchart illustrating operations of a control method of an electronic apparatus according to an example embodiment of the present disclosure.

FIG. 8 is a flowchart illustrating operations of a control method of an electronic apparatus according to an example embodiment of the present disclosure. As would be apparent to one skilled in the art, in some cases, operations of FIG. 8 may be performed in a different order from that shown in the drawing.

Referring to FIG. 8, in operation 810, an electronic apparatus may identify a first input that is input to at least one of a first surface and a second surface. The first surface may include a front surface of the electronic apparatus and the second surface may include a rear surface of the electronic apparatus. The first input may include a plurality of inputs. For example, the first input may include a touch input applied to the first surface and a touch input applied to the second surface.

In the example embodiment, when the first input includes a plurality of inputs, the electronic apparatus may identify an area of each of the plurality of inputs. The electronic apparatus may exclude an input greater than or equal to a predetermined size from the first input based on the identified areas and determine remaining inputs to be the first input.

In operation 820, the electronic apparatus may control a size of a display exposed on the first surface based on the first input. The electronic apparatus may control the size of the exposed display based on a predetermined scheme corresponding to the first input. For example, the electronic apparatus may control the size of the exposed display based on at least one of a positional relationship, a moving speed, a moving direction, a maintenance time, a pressure and a number of inputs of the first input.

For example, when the number of (or a sum of the number of) touch inputs included in the first input is 2, the electronic apparatus may expand the display to have a first size. Also, when the number of touch inputs included in the first input is 3, the electronic apparatus may expand the display to have a second size. Since related examples have been described with reference to FIG. 7 and will also be described with reference to the following drawings, repeated description will be omitted.

In operation 830, the electronic apparatus may control a screen displayed on the display based on the first input. The electronic apparatus may control a screen displayed on the display in a predetermined mode corresponding to the first input. For example, when the number of touch inputs included in the first input is 2, the electronic apparatus may divide the screen into two portions to be displayed on the display.

Figure 9:
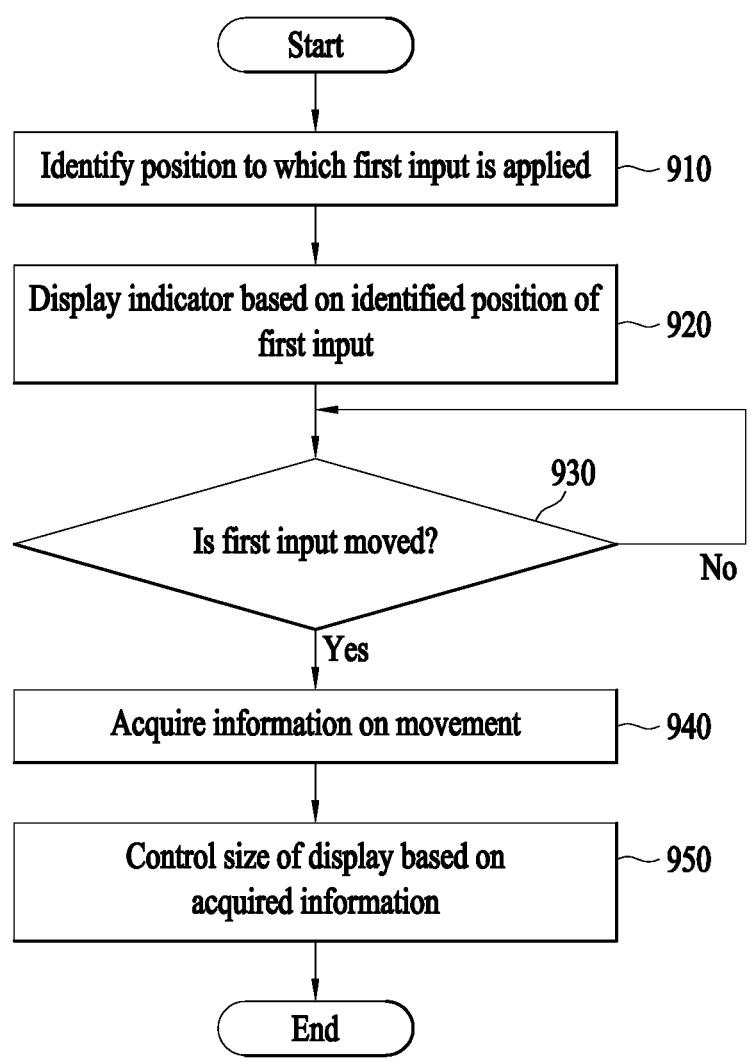
FIG. 9 is a flowchart illustrating a detailed flow of one operation of a control method of an electronic apparatus according to an example embodiment of the present disclosure.

FIG. 9 is a flowchart illustrating a flow of one operation of a control method of an electronic apparatus according to an example embodiment of the present disclosure. FIG. 9 illustrates an example embodiment related to operation 820 of FIG. 8.

Referring to FIG. 9, in operation 910, an electronic apparatus may identify a position to which a first input is applied. Specifically, the electronic apparatus may identify a position to which a first input is applied on a display. The first input may be an input made by a user and may be, for example, a touch input.

In the example embodiment, the first input may be an input applied to at least one of a first surface and a second surface of the electronic apparatus. The first surface may include a front surface of the electronic apparatus. The second surface may include a rear surface of the electronic apparatus. When the first input includes an input to the first surface and an input to the second surface, the electronic apparatus may identify a position of the input applied to each of the first surface and the second surface.

In operation 920, the electronic apparatus may display an indicator based on the identified position of the first input. As an example, the electronic apparatus may display the indicator at a position determined in association with the position of the first input. As another example, the electronic apparatus may display the indicator such that at least a portion of the indicator overlaps the position of the first input.

In the example embodiment, when the first input includes inputs applied to a plurality of positions, the electronic apparatus may display the indicator based on a position of an input applied to the first surface among the inputs included in the first input.

Operation 910 or 920 may be omitted in some example embodiments.

In operation 930, the electronic apparatus may verify whether the first input is moved. A movement of the first input may include, for example, a positional change on the display such as dragging. In some cases, the movement of the first input may be made on the indicator but not limited thereto.

In operation 940, the electronic apparatus may acquire information on the movement. Specifically, the electronic apparatus may acquire information on at least one of a final position of the first input changed due to the movement, a moving direction of the first input, a moving speed of the first input, and a moving distance of the first input.

In operation 950, the electronic apparatus may control the size of the display based on the acquired information.

In the example embodiment, the electronic apparatus may control the size of the display to be a size determined to correspond to the final position of the first input. For example, the electronic apparatus may control the size of the display to be a first size when the final position of the first input is a first position, and may control the size of the display to be a second size when the final position of the first input is a second position.

In the example embodiment, the electronic apparatus may control the size of the display based on the moving direction of the first input. For example, the electronic apparatus may increase the size of the display when the moving direction of the first input includes a first direction, and may reduce the size of the display when the moving direction includes a second direction.

In the example embodiment, the electronic apparatus may control the size of the display at a speed corresponding to the moving speed of the first input. For example, when the moving speed of the first input is a first speed, the electronic apparatus may expand the display at a second speed. In this example, the first speed and the second speed may be the same or different from each other.

In the example embodiment, the electronic apparatus may control the size of the display by a length corresponding to the moving distance of the first input. For example, the electronic apparatus may expand or reduce the display by a length corresponding to the moving distance of the first input.

In the example embodiment, the electronic apparatus may control the size of the display based on a form of the first input. For example, the electronic apparatus may identify the number of inputs applied to the second surface among inputs included in the first input. The electronic apparatus may control the size of the display to be the first size when the identified number of inputs is 2, and may control the size of the display to be the second size when the identified number of inputs is 3. In this example, a speed of changing the size of the display may be determined based on the moving speed of the first input but not limited thereto.

Figure 10:
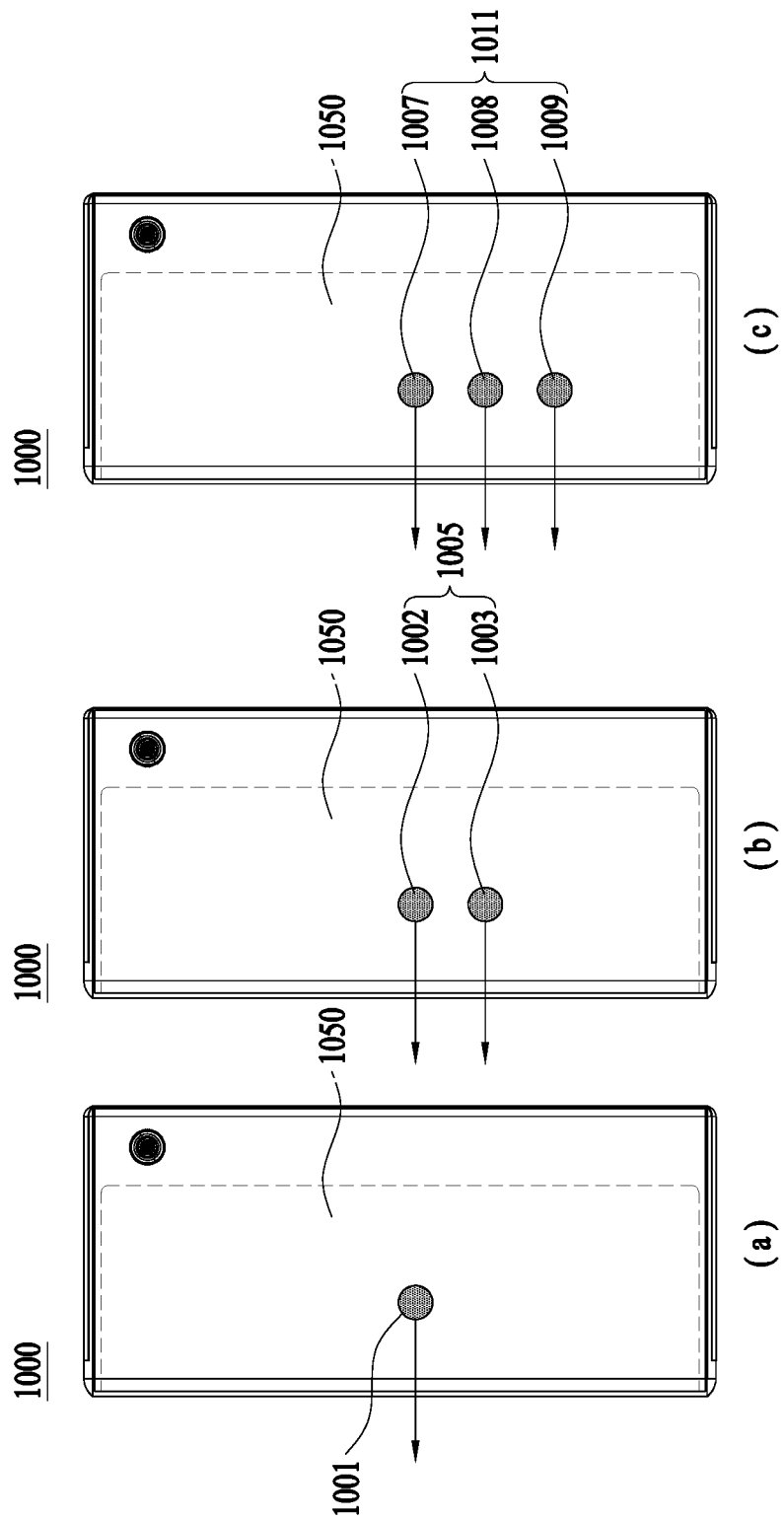
FIG. 10 is a diagram illustrating an example of an input applied to a rear surface of an electronic apparatus according to an example embodiment of the present disclosure.

FIG. 10 is a diagram illustrating an example of an input applied to a rear surface of an electronic apparatus according to an example embodiment of the present disclosure.

Referring to FIG. 10, a display 1050 may be located at a rear surface of an electronic apparatus 1000. The display 1050 may be at least a portion of a display included in the electronic apparatus 1000, and may extend from a display on a front surface of the electronic apparatus 1000.

(a) of FIG. 10 illustrates a case in which one input is applied to the rear surface of the electronic apparatus 1000. Specifically, an input may be applied to a first position 1001 on the display 1050. The applied input may be a touch input and move in one direction.

A moving direction may correspond to a direction in which a size of the display is controlled. For example, when the input moves in a first direction in which the display is expanded, the size of the display may increase. Also, when the input moves in a second direction in which the display is reduced, the size of the display be reduced.

In the example embodiment, the input applied to the first position 1001 may be based on a finger of a user touching the display 1050. For example, the input may be applied in response to a forefinger touching the display 1050.

(b) of FIG. 10 illustrates a case in which two inputs are applied to the rear surface of the electronic apparatus 1000. Specifically, the input may be applied to each of a first position 1002 and a second position 1003 on the display 1050. The applied input may be a touch input and may move in one direction. The inputs applied to the first position 1002 and the second position 1003 may be included in one input, that is, a first input 1005.

In the example embodiment, the input applied to each of the first position 1002 and the second position 1003 may be based on a finger of a user touching the display 1050. For example, the inputs may be applied in response to a forefinger and a middle finger touching the display 1050.

(c) of FIG. 10 illustrates a case in which three inputs are applied to the rear surface of the electronic apparatus 1000. Specifically, the input may be applied to each of a first position 1007, a second position 1008, and a third input 1009 on the display 1050. The applied input may be a touch input and may move in one direction. The inputs applied to the first position 1007, the second position 1008, and the third position 1009 may be included in one input, that is, a first input 1011.

In the example embodiment, the input applied to each of the first position 1007, the second position 1008, and the third position 1009 may be based on a finger of a user touching the display 1050. For example, the inputs may be applied in response to a forefinger, a middle finger, and a ring finger touching the display 1050.

Figure 11:
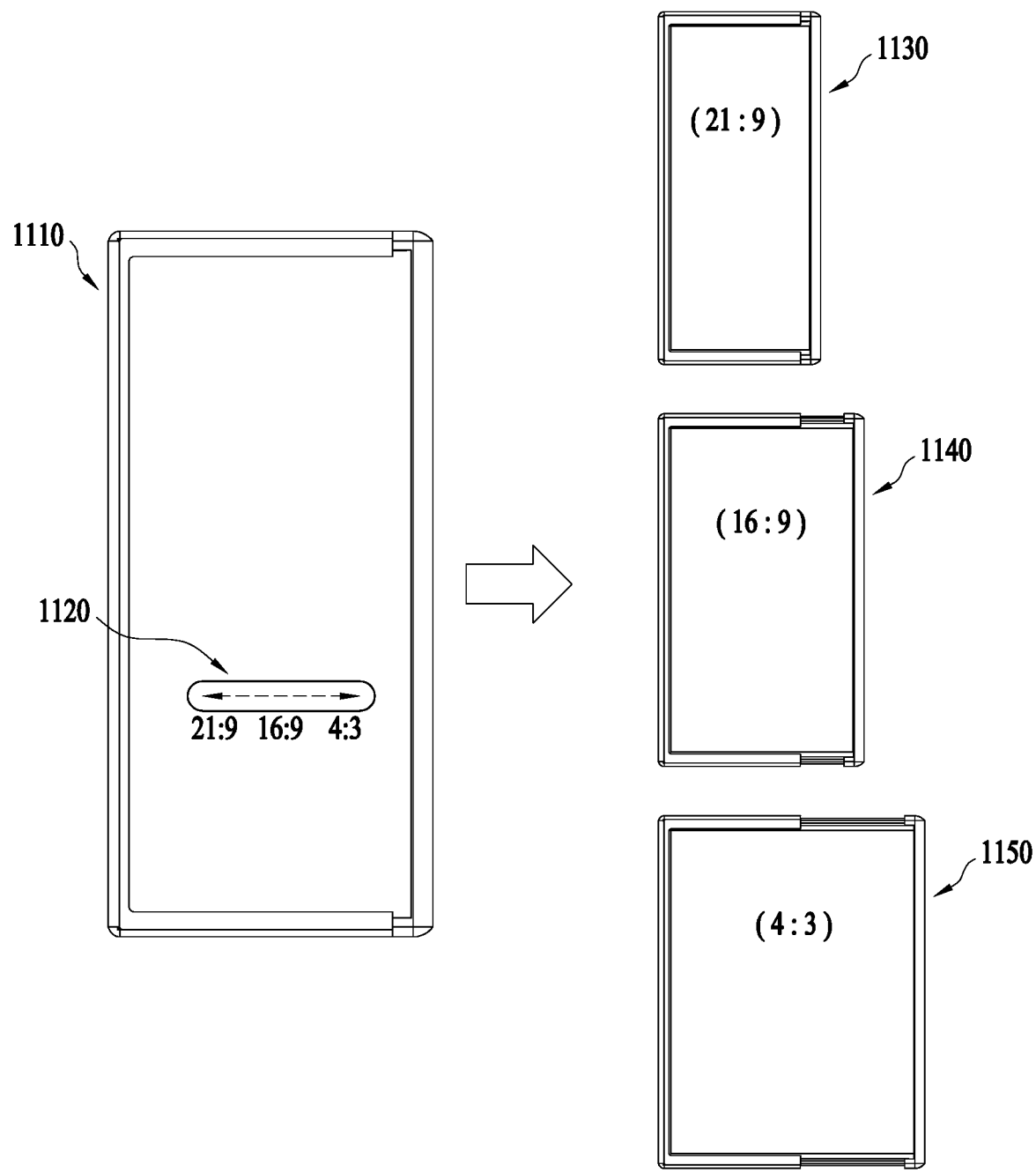
FIG. 11 is a diagram illustrating an operation of an electronic apparatus according to an example embodiment of the present disclosure.

FIG. 11 is a diagram illustrating an operation of an electronic apparatus according to an example embodiment of the present disclosure. Specifically, FIG. 11 illustrates an example of controlling a size of an electronic apparatus 1110 on which an indicator is displayed.

Referring to FIG. 11, the indicator 1120 may be displayed on the electronic apparatus 1110. The indicator 1120 may include content in a shape of a rounded bar (or a bar) in which a length corresponding to a display expansion direction (e.g., a horizontal length) is greater than a vertical length, but not limited thereto.

The indicator 1120 may include display size information determined for each position of the indicator 1120. The display size information may be displayed below the indicator 1120 in the shape of the rounded bar as illustrated in FIG. 11. However, a position of the display size information is not limited thereto. For example, the display size information may be displayed above the indicator 1120 or in the rounded bar of the indicator 1120.

Although not shown, an input may be applied to the indicator 1120. The applied input may be moved on the indicator 1120. In this case, the electronic apparatus 1110 may identify a final position of the input on the indicator 1120. The electronic apparatus may control a size of a display of the electronic apparatus 1110 to be a size corresponding to the final position of the input.

For example, when the final position of the input corresponds to a position at which information indicating "21:9" is displayed, the size of the display may be controlled to be a first size 1130 having a ratio of "21:9." When the final position of the input corresponds to a position at which information indicating "16:9" is displayed, the size of the display may be controlled to be a second size 1140 having a ratio of "16:9." When the final position of the input corresponds to a position at which information indicating "4:3" is displayed, the size of the display may be controlled to be a third size 1150 having a ratio of "4:3."

In the example embodiment, when the final position of the input corresponds to a position at which information is omitted, the electronic apparatus may control the size of the display to be a size determined based on coordinates of the input. For example, when the final position of the input is an intermediate position between "21:9" and "16:9", the size of the display may be controlled to have a ratio corresponding to "18.6:9" which is an intermediate ratio between "21:9" and "16:9."

Figure 12:
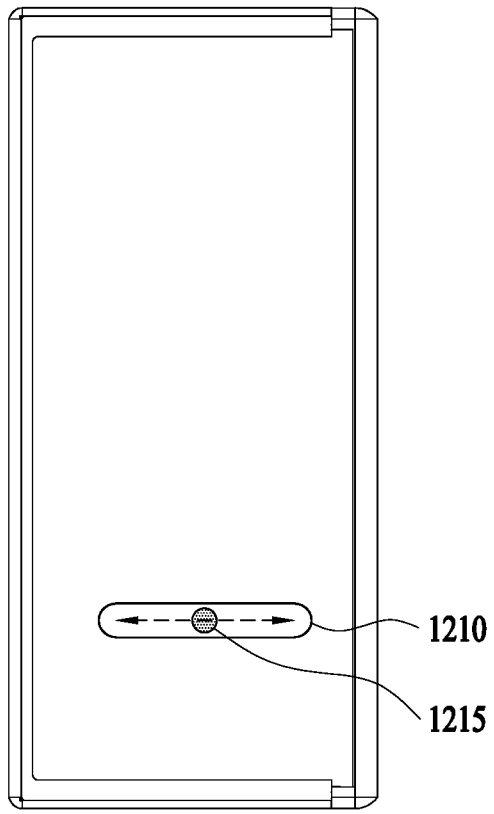
FIG. 12 is a diagram illustrating an example of displaying an indicator on an electronic apparatus according to an example embodiment of the present disclosure.
Figure 12:
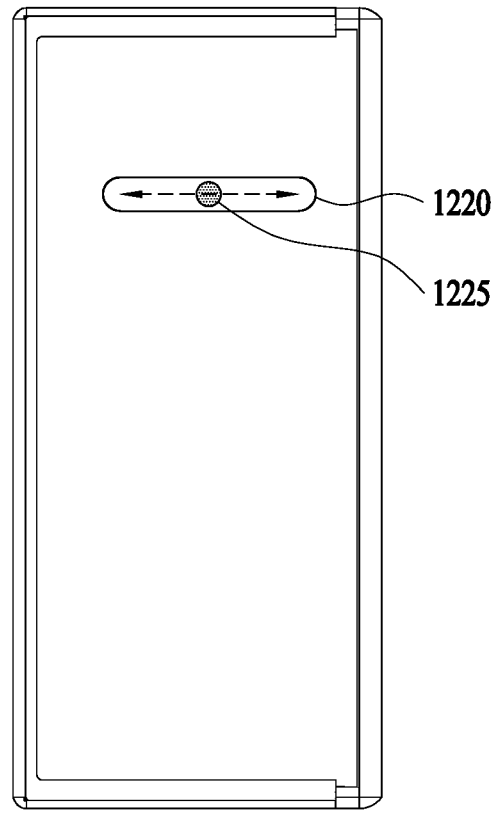

FIG. 12 is a diagram illustrating an example of displaying an indicator on an electronic apparatus according to an example embodiment of the present disclosure.

Referring to (a) of FIG. 12, an input may be applied to a first position 1215 of an electronic apparatus 1200. When the input is applied to the first position 1215, an indicator 1210 may be displayed based on the first position 1215. Specifically, when the input is applied to the first position 1215, the indicator 1210 may be displayed such that at least a portion of the indicator 1210 is located at a position determined in association with the first position 1215. In one example, as illustrated in (a) of FIG. 12, the indicator 1210 may be displayed such that a center of the indicator 1210 is coincident with the first position 1215. In another example, the indicator 1210 may be displayed such that a left edge of the indicator 1210 is coincident with the first position 1215.

(b) of FIG. 12 illustrates an example of an indicator 1220 displayed when an input is applied to a second position 1225. Referring to (b) of FIG. 12, in response to the input applied to the second position 1225 being identified, the indicator 1220 may be displayed based on the second position 1225. That is, the indicator 1220 may be displayed such that a center of the indicator 1220 is coincident with the second position 1225.

However, embodiments are not limited thereto. For example, the indicator 1210 may be displayed such that at least a portion of the indicator 1210 is located at a position determined in association with the second position 1225.

Figure 13:
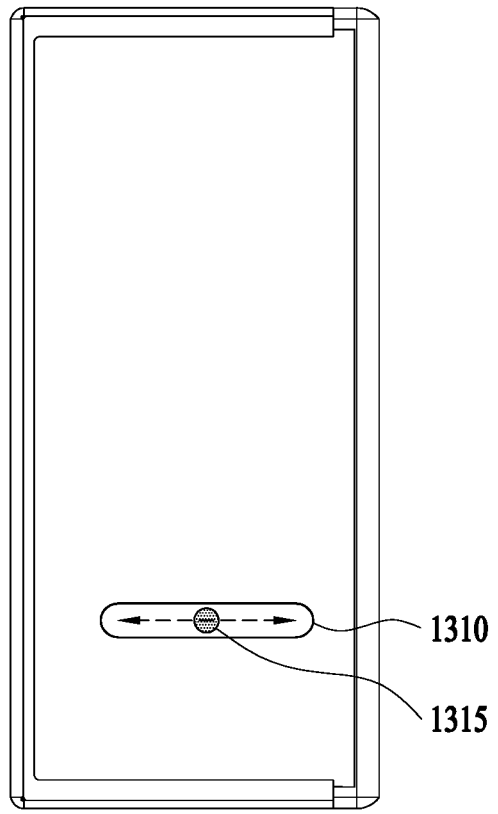
FIG. 13 is a diagram illustrating another example of displaying an indicator on an electronic apparatus according to an example embodiment of the present disclosure.
Figure 13:
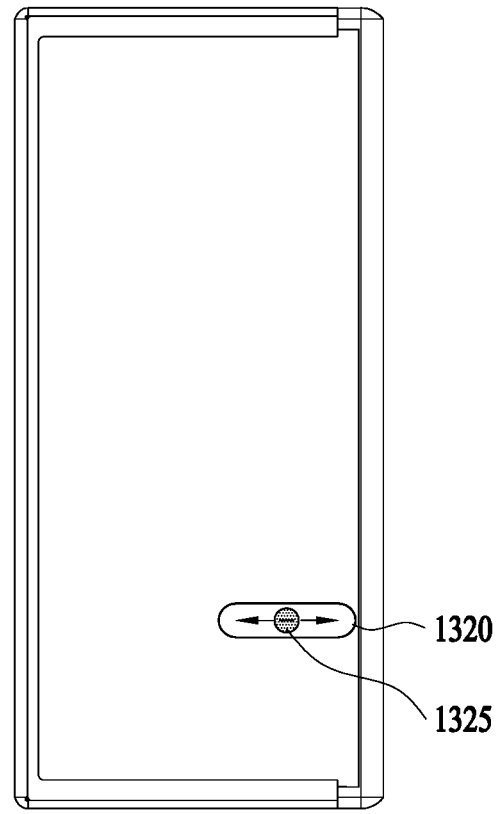

FIG. 13 is a diagram illustrating another example of displaying an indicator on an electronic apparatus according to an example embodiment of the present disclosure. Specifically, FIG. 13 illustrates an example of changing a size of an indicator based on a position to which an input is applied.

Referring to (a) of FIG. 13, when an input is applied to a first position 1315 that is a position apart from one surface of an electronic apparatus 1300 by at least a first distance, an indicator 1310 may be displayed in a first size. The first size may be a predetermined size corresponding to the first distance. For example, the first size may include a size that a maximum length between both ends of the indicator 1310 is at least twice the first distance. Specifically, when the first distance is one centimeter (cm), the first size may be represented in, for example, a shape of a bar of which a maximum length between both ends of the indicator 1310 (e.g., a horizontal length) is 3 cm.

Referring to (b) of FIG. 13, when an input is applied to a second position 1325 that is a position separated from one surface of the electronic apparatus 1300 by the first distance or less, an indicator 1320 may be displayed in a second size. The second size may be less than the first size of (a) of FIG. 13.

Although not shown, the indicator 1320 may be provided in a fixed size. In this case, when it is assumed that a front surface of the electronic apparatus 1300 is a xy plane, the indicator 1320 may be displayed in a constant size while a position on a y axis is changed based on an input.

Although the rounded bar-shaped indicator (e.g., the indicator 1320) is shown in the drawings as an example, a shape of an indicator is not limited thereto. An indicator may be provided in various shapes such a quadrangle, an arrow, or the like, for example.

Figure 14:
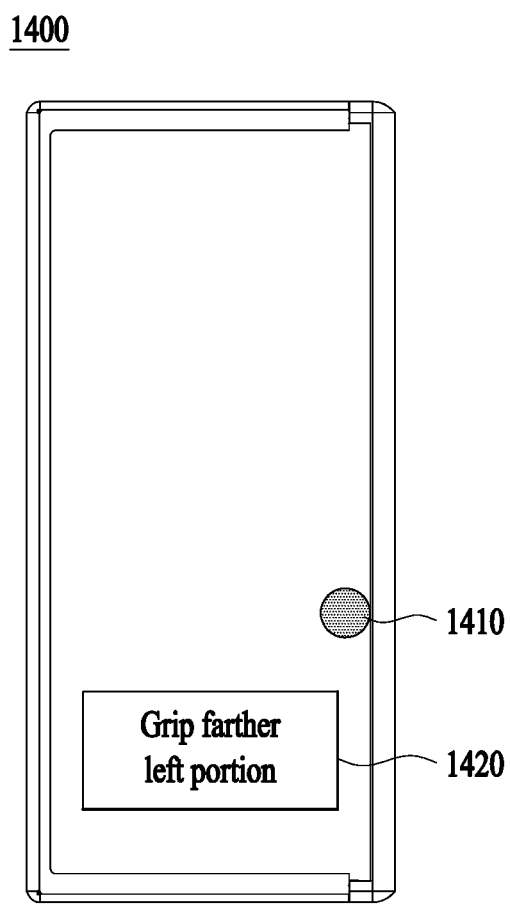
FIG. 14 is a diagram illustrating an example of a screen displayed on an electronic apparatus according to an example embodiment of the present disclosure.

FIG. 14 is a diagram illustrating an example of a screen displayed on an electronic apparatus according to an example embodiment of the present disclosure. Specifically, FIG. 14 illustrates an example of a screen displayed on a display when an input (1410) applied to an electronic apparatus 1400 is apart from one surface of the electronic apparatus 1400 by a first distance or less.

Referring to FIG. 14, when the input is apart from one surface of the electronic apparatus 1400 by the first distance or less, a notification 1420 for inducing an action of a user may be provided to increase a length of the first distance. The notification 1420 may include a text "grip a farther left portion" but not limited thereto.

Figure 15:
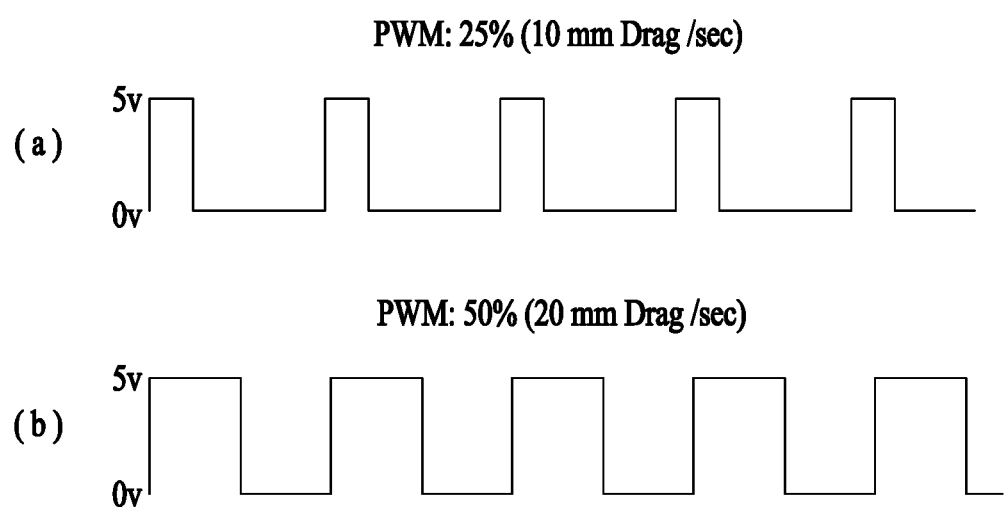
FIG. 15 is a diagram illustrating a display size control speed of an electronic apparatus according to an example embodiment of the present disclosure.

FIG. 15 is a diagram illustrating a display size control speed of an electronic apparatus according to an example embodiment of the present disclosure. Specifically, FIG. 15 is a diagram for explaining a method of determining a size control speed of a display when the size control speed changes based on a moving speed of an input applied to an electronic apparatus.

The electronic apparatus may identify a position of an input applied on a display. Even when the input is moved, the electronic apparatus may identify a position to which the input is moved, and identify a moving speed of the input based on the identified position.

The electronic apparatus may determine a PWM of a motor control signal associated with a display size change based on the identified moving speed of the input. Referring to (a) of FIG. 15, when the moving speed of the input is a speed of moving 10 millimeters (mm) per second, the PWM may be 25%. The PWM for each moving speed of the input may be determined in advance but not limited thereto. The PWM may be calculated proportionally based on a value of the moving speed.

For example, as illustrated in (b) of FIG. 15, when the moving speed of the input is increased to 20 mm per second, the PWM may be determined to be a value proportionally increased by 50%, that is, twice.

A determination of the PWM is not limited to the foregoing example. The PWM may be determined in various ways that reflect the moving speed of the input.

Figure 16:
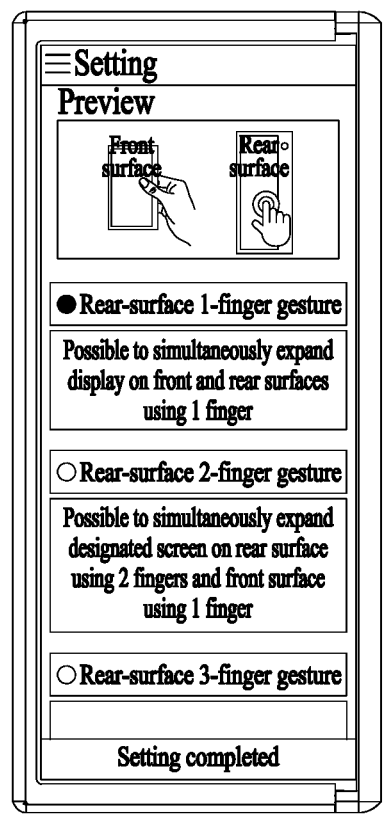
FIGS. 16 through 18 are diagrams illustrating examples of a setting screen related to a display size control of an electronic apparatus according to an example embodiment of the present disclosure.
Figure 17:
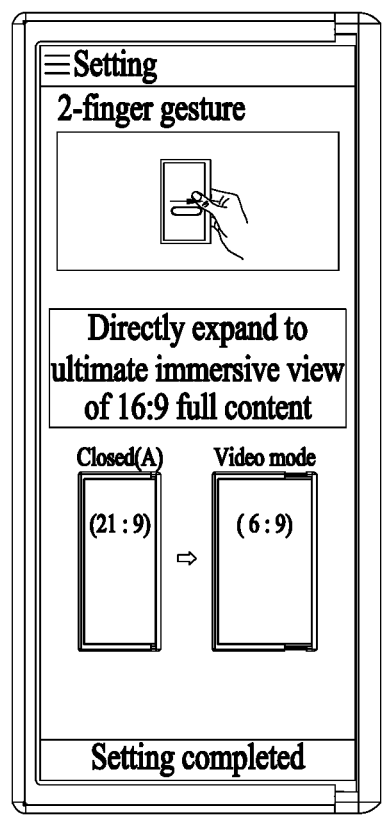
Figure 17:
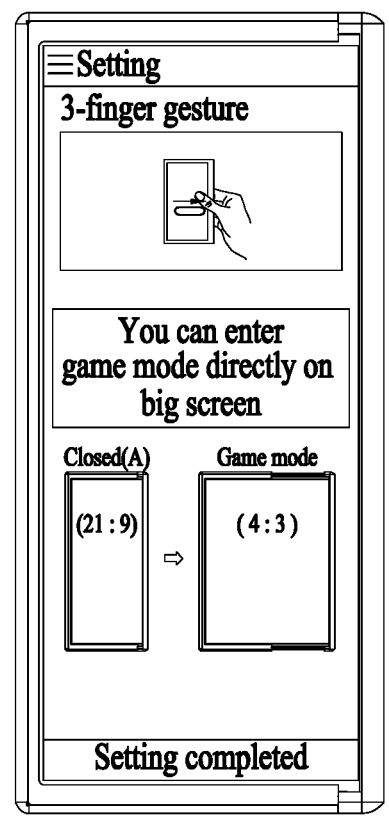
Figure 18:
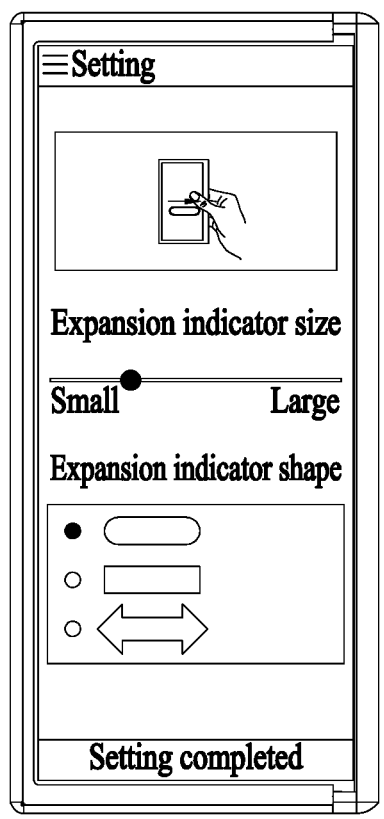
Figure 18:
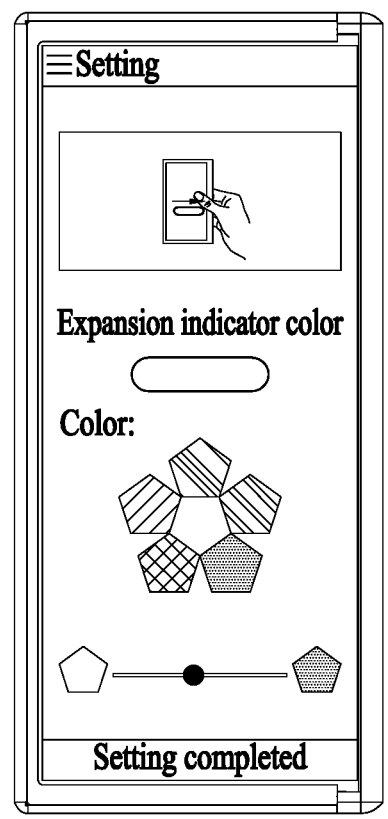

FIGS. 16 through 18 are diagrams illustrating examples of a setting screen related to a display size control of an electronic apparatus according to an example embodiment of the present disclosure.

FIG. 16 illustrates an example of a setting window provided to determine an input for display size control based on a selection of a user. Referring to FIG. 16, an electronic apparatus may provide a "rear-surface 1-finger gesture" field corresponding to a case in which one input is applied to a front surface and one input is applied to a rear surface, a "rear-surface 2-finger gesture" field corresponding to a case in which one input is applied to the front surface and two inputs are applied to the rear surface, and a "rear-surface 3-finger gesture" field corresponding to a case in which one input is applied to the front surface and three inputs are applied to the rear surface.

When one of the provided fields is selected, an input for display expansion may be set as an input corresponding to the selected field. In this case, the electronic apparatus may control a size of a display in response to an input corresponding to the set input being identified.

For example, as shown in the drawing, when the "rear-surface 1-finger gesture" field is selected, the size of the display may be controlled in response to one input to the front surface and one input to the rear surface being identified.

FIG. 17 illustrates an example of setting a size of a display based on a type of an input.

Specifically, (a) of FIG. 17 illustrates an example of a screen displayed on the electronic apparatus in a case in which a size of a display is set to be changed at a ratio of 16:9 when an input of "rear-surface 2-finger gesture" is applied.

(b) of FIG. 17 illustrates an example of a screen displayed on the electronic apparatus in a case in which a size of a display is set to be changed at a ratio of 4:3 when an input of "rear-surface 3-finger gesture" is applied.

Each of the screens may provide a text for informing of the corresponding screen, for example, "Directly expand to the ultimate immersive view of 16:9 full content" or "You can enter the game mode directly on the big screen." In this case, when the size of the display is to be set by a user, related information may be provided to the user, so that the user customizes the size of the display based on a desired use of the user.

FIG. 18 illustrates an example of setting a size, shape, or color of an indicator provided in association with a display control. Specifically, (a) of FIG. 18 illustrates an example of a screen for setting a size and a shape of an indicator. (b) of FIG. 18 illustrates an example of setting a color of an indicator.

Referring to (a) of FIG. 18, a size of a displayed indicator may be set based on a horizontally changed position of a node displayed in a circular shape in association with the size of the indicator.

For example, the size of the indicator may be set to be reduced when the node moves leftwardly and set to be increased when the node moves rightwardly.

The indicator may be set in various shapes. For example, as illustrated in FIGS. 11 through 13, the indicator may have a bar shape. However, a shape of the indicator is not limited thereto. For example, as illustrated in (a) of FIG. 18, the indicator may have a shape of a rectangle or an arrow.

Referring to (b) of FIG. 18, an indicator may be set in various colors. As shown in the drawing, information on exemplary colors (displayed in different patterns in (b) of FIG. 8) may be provided. A color of the indicator may be determined based on an input of a user selecting one of the colors.

Also, a brightness of the indicator may be determined. The brightness may be determined through an adjustment of the indicator on a line shown in a lower portion of (b) of FIG. 18.

Figure 19:
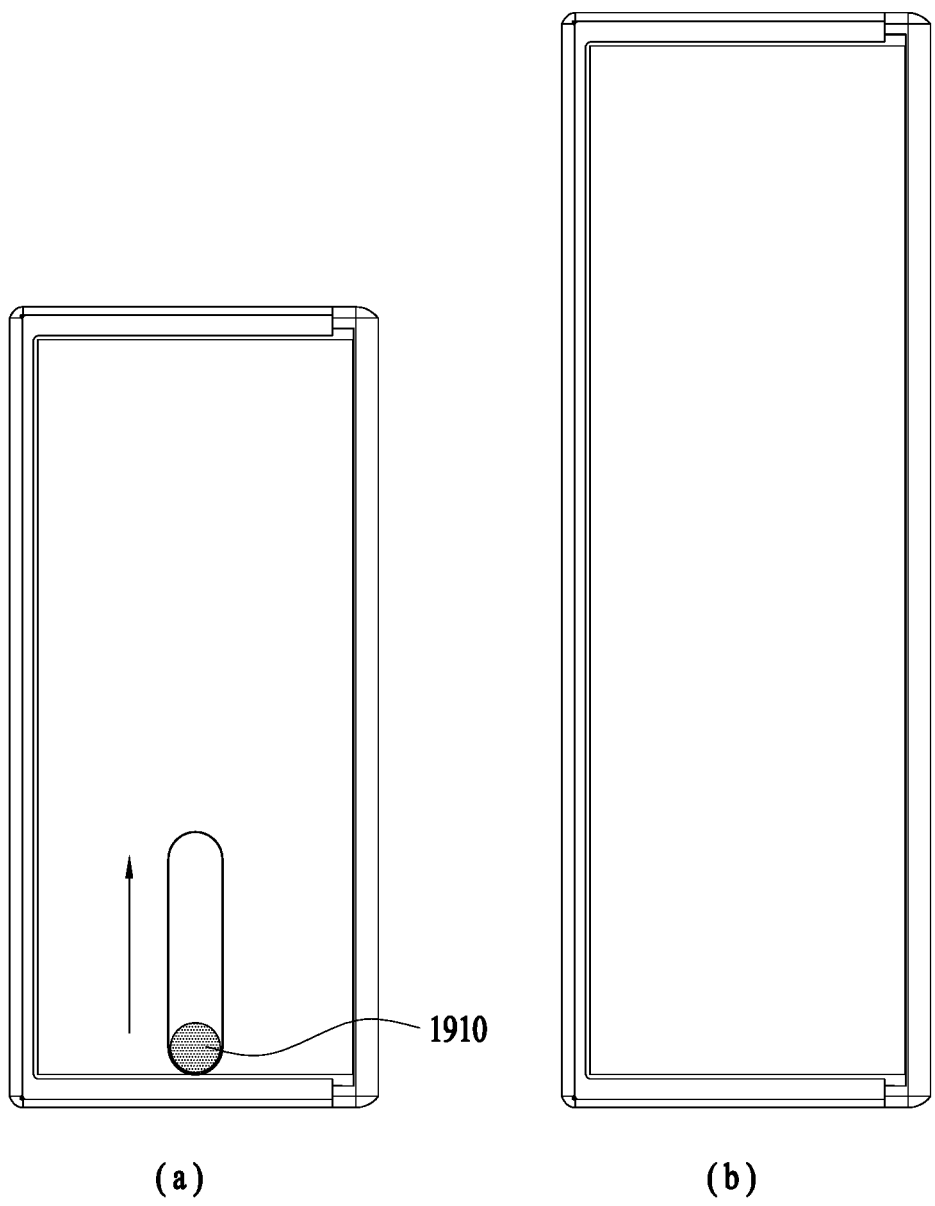
FIG. 19 is a diagram illustrating an operation of an electronic apparatus according to another example embodiment of the present disclosure.

FIG. 19 is a diagram illustrating an operation of an electronic apparatus according to another example embodiment of the present disclosure. Specifically, FIG. 19 illustrates an example of a case in which a display expansion direction of an electronic apparatus is a vertical (or y-axial) direction.

Referring to (a) of FIG. 19, an indicator may be displayed based on an input being applied to a first position 1910 of an electronic apparatus. On the indicator, the input may move in a first direction. For example, the first direction may be an upward direction like a direction indicated by an arrow of (a) of FIG. 19.

A size of a display may be controlled based on a movement of an input. The movement of the input may correspond to a display size control direction. For example, when a moving direction of the input is the upward direction, the display may be expanded upwardly. Through this, the electronic apparatus may have an expanded display as shown in (b) of FIG. 19.

Figure 20:
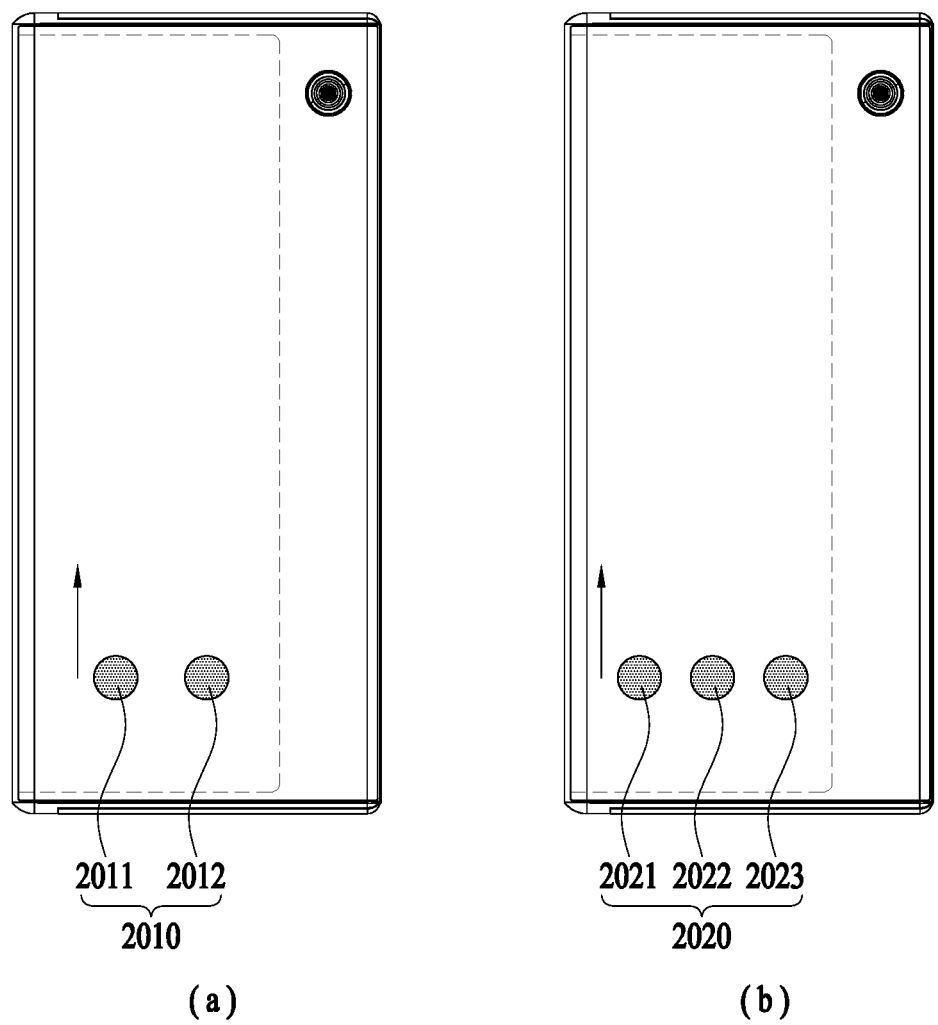
FIG. 20 is a diagram illustrating an example of an input received in a rear surface of an electronic apparatus according to another example embodiment of the present disclosure.

FIG. 20 is a diagram illustrating an example of an input applied to a rear surface of an electronic apparatus according to another example embodiment of the present disclosure.

(a) of FIG. 20 illustrates a case in which two inputs are applied to a rear surface of an electronic apparatus. (b) of FIG. 20 illustrates a case in which three inputs are applied to the rear surface of the electronic apparatus.

Referring to (a) of FIG. 20, inputs may be applied to two different positions 2011 and 2012 on the rear surface of the electronic apparatus. The inputs to the two different positions 2011 and 2012 may be referred to be as one input in some example embodiments.

Referring to (b) of FIG. 20, inputs may be applied to three different positions 2021, 2022, and 2023 on the rear surface of the electronic apparatus. The inputs to the three different positions 2021, 2022, and 2023 may be referred to be as one input in some example embodiments.

Such input may include a drag input moving in a specific direction, for example, a direction toward a top of the electronic apparatus. When the drag input is applied, the electronic apparatus may be expanded based on the moving direction of the input. Since the related description has been made above, repeated description will be omitted.

Figure 21:
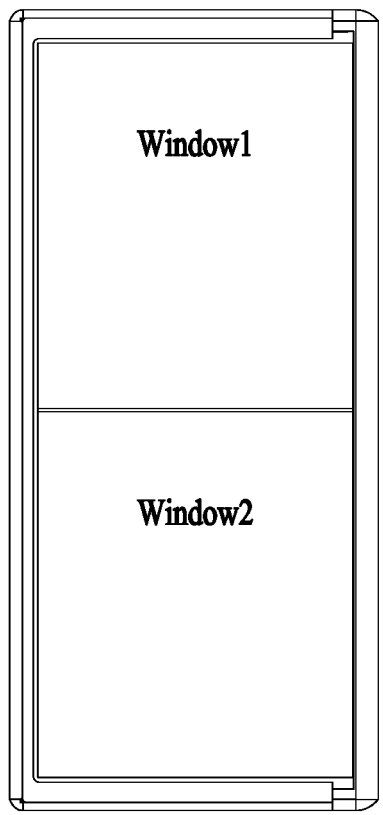
FIG. 21 is a diagram illustrating an example of a screen displayed on an electronic apparatus according to another example embodiment of the present disclosure.
Figure 21:
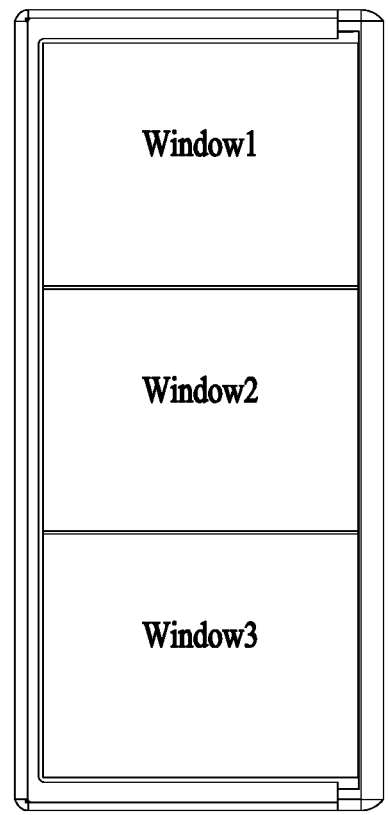

FIG. 21 is a diagram illustrating an example of a screen displayed on an electronic apparatus according to another example embodiment of the present disclosure.

Referring to FIG. 21, a displayed screen may be divided based on an expansion of a display. For example, the screen of the display may be divided into two screen portions as shown in (a) of FIG. 21, or divided into three screen portions as shown in (b) of FIG. 21.

A type of such division may be determined in advance based on a type of an applied input. For example, when inputs are applied to two positions on a rear surface of the electronic apparatus, the screen of the display may be divided into two portions as shown in (a) of FIG. 21. When inputs are applied to three positions on the rear surface of the electronic apparatus, the screen of the display may be divided into three portions as shown in (b) of FIG. 21.

According to an example embodiment of the present disclosure, an electronic apparatus and a control method of the electronic apparatus may control a size of a display based on at least one of a moving direction, a moving speed, and a position of an input of a user, thereby providing an experience of more intuitive display size control.

According to an example embodiment of the present disclosure, an electronic apparatus and a control method of the electronic apparatus may change a size of a display based on an input to at least one surface of the display, thereby more easily and efficiently changing the size of the display and improving usability.

Effects are not limited to the aforementioned effects, and other effects not mentioned will be clearly understood by those skilled in the art from the description of the claims.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means which implement the function/act specified in the flowcharts and/or block diagrams. The computer program instructions may also be loaded onto a computer or other programmable data processing apparatus to cause a series of operations to be performed on the computer or other programmable apparatus to produce a computer implemented process such that the instructions which are executed on the computer or other programmable apparatus provide operations for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

The above description is merely illustrative of the technical idea of the present disclosure, and those skilled in the art to which the present disclosure pertains may make various modifications and changes without departing from the essential quality of the present disclosure. Accordingly, the embodiments disclosed herein are not intended to limit the technical spirit of the present disclosure but to describe the present disclosure, and the scope of the technical spirit of the present disclosure is not limited by these embodiments. The scope of protection of the present disclosure should be interpreted by the following claims, and all technical ideas that fall within the scope of equivalents thereof should be construed as being included in the scope of the present disclosure.

What is claimed is:

1. An electronic apparatus comprising:
   a flexible display comprising a first display area disposed at a first side of the electronic apparatus and a second display area disposed at a second side opposite to the first side; and
   a controller,
   wherein the controller is configured to:
   detect a user input comprising a first drag input via the first display area and a second drag input via the second display area, wherein the first drag input is different from the second drag input; and
   control a size of the first display area of the flexible display based on the detected user input.

2. The electronic apparatus of claim 1, wherein
the controller is further configured to control the size of the first display area of the flexible display based on a first direction of the first drag input and a second direction of the second drag input.

3. The electronic apparatus of claim 2, wherein the controller is further configured to control the size of the first display area of the flexible display based on at least one of a number of touch inputs via the first display area or a number of touch inputs corresponding via the second display area.

4. The electronic apparatus of claim 2, wherein the first side corresponds to a front side and the second side corresponds to a rear side is at a front of the electronic apparatus, wherein the first display area and the second display area are coupled to each other at one side of the electronic apparatus.

5. The electronic apparatus of claim 1, wherein the size of the first drag input and a size of the second drag input is less than or equal to a predetermined value.

6. The electronic apparatus of claim 1, wherein the controller is further configured to detect the first drag input and the second drag input within a predetermined time range.

7. The electronic apparatus of claim 1, wherein the controller is further configured to execute at least one application based on at least one of a number of touch inputs via the first display area or a number of the touch inputs via the second display area.

8. The electronic apparatus of claim 1, wherein the controller is further configured to determine the size of the first display area based on a number of touch inputs via the second display area.

9. The electronic apparatus of claim 1, wherein the controller is further configured to:
   display, on the first display area, an indicator based on the user input; and
   control the size of the first display area of the flexible display area based on a further input related to the indicator.

10. The electronic apparatus of claim 9, wherein the controller is further configured to control a speed of changing the size of the first display area of the flexible display based on at least one of a positional relationship between the further input and the indicator or a moving speed of the further input.

11. The electronic apparatus of claim 9, wherein the further input includes a third drag input,
    wherein the controller is further configured to control the size of the first display area of the flexible display based on a distance corresponding to the third drag input.

12. The electronic apparatus of claim 1, wherein the controller is further configured to expand the size of the first display area of the flexible display based on the user input, and
    to determine, based on the user input, contents to display on the expanded first display area display or an arrangement of the contents.

13. The electronic apparatus of claim 1, wherein the controller is further configured to control the size of the first display area on the flexible display based on at least one of a hold time or a pressure corresponding to the first drag input.

14. The electronic apparatus of claim 1, wherein the controller is further configured to control the size of the first display area on the flexible display in accordance with contents displayed on the first display area of the flexible display.

15. A control method of an electronic apparatus that comprises a flexible display disposed such that a size of a first display area of the flexible display exposed on a first side of the electronic apparatus is changed, the method comprising:
   detecting a user input comprising a first drag input via a first display area of the flexible display and a second drag input via a second display area of the flexible display, wherein the first drag input is different from the second drag input; and
   controlling the size of the first display area of the flexible display exposed on the first side based on the detected user input, wherein the first display area is disposed at a first side of the electronic apparatus and the second display area is disposed at a second side opposite to the first side.

16. The control method of claim 15, further comprising: controlling the size of the first display area of the flexible display based on a first direction of the first drag input and a second direction of the second drag input.

17. The control method of claim 16, further comprising:
   displaying, on the first display area, an indicator based on the user input, and
   controlling the size of the first display area of the flexible display area based on a further input related to the indicator.

18. The control method of claim 17, wherein controlling the size of the first display area further comprises: controlling at least one of the size of the first display area or a speed of changing the size of the first display area based on at least one of a positional relationship between the further input and the indicator a moving speed of the further input.

19. The control method of claim 15, wherein detecting the user input further comprises detecting the first drag input and the second drag input within a predetermined time range.

20. The control method of claim 15, further comprising controlling the size of the first display area of the flexible display based on at least one of a number of touch inputs via the first display area or a number of touch inputs corresponding via the second display area.

* * * * *